(12) United States Patent
Shukla et al.

(10) Patent No.: US 12,724,872 B2
(45) Date of Patent: Sep. 1, 2026

(54) METHODS AND SYSTEMS FOR BUILDING RICH CONTEXT FOR EFFECTIVE PASSWORD DETECTION IN PLAINTEXT

(71) Applicant: Tata Consultancy Services Limited, Mumbai (IN)

(72) Inventors: Manish Shukla, Pune (IN); Shubham Mukeshbhai Malaviya, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 37 days.

(21) Appl. No.: 19/069,692

(22) Filed: Mar. 4, 2025

(65) Prior Publication Data

US 2025/0284792 A1 Sep. 11, 2025

(30) Foreign Application Priority Data

Mar. 6, 2024 (IN) ............................ 202421015896

(51) Int. Cl.
*G06F 21/46* (2013.01)
*G06F 21/57* (2013.01)
*G06F 40/284* (2020.01)

(52) U.S. Cl.
CPC ............ *G06F 21/46* (2013.01); *G06F 21/577* (2013.01); *G06F 40/284* (2020.01)

(58) Field of Classification Search
CPC ...... G06F 21/46; G06F 21/577; G06F 40/284; G06F 21/00; G06F 21/31; G06F 21/562;
(Continued)

(56) References Cited

U.S. PATENT DOCUMENTS 10,762,192 B2 * 9/2020 Boutnaru ............ G06F 16/3347
11,693,967 B2 * 7/2023 Alturaifi ................ G06F 16/38 726/22

(Continued)

OTHER PUBLICATIONS

Feng R, Yan Z, Peng S, Zhang Y. Automated detection of password leakage from public github repositories. InProceedings of the 44th International Conference on Software Engineering May 21, 2022 (pp. 175-186). (Year: 2022).*

(Continued)

*Primary Examiner* — Shin-Hon (Eric) Chen
*Assistant Examiner* — Ethan V Vo
(74) *Attorney, Agent, or Firm* — Finnegan, Henderson, Farabow, Garrett & Dunner, LLP

(57) ABSTRACT

The disclosure relates generally to methods and systems for building rich context for effective password detection in plaintext. Detecting and securing plaintext passwords on hard-disk or storage device is difficult as humans generate passwords in a variety of idiosyncratic ways which results in high false negatives and involves a high computation cost. In the present disclosure, a stepped context analysis is performed which applies different context discovery strategies in sequential manner. In scenarios, where a potential password is unable to find in a file using simple detection method, but if the context likelihood of the file is higher than the configured threshold then the file is searched again with more detailed techniques for detecting presence of a potential password. This selective second pass for a few files helps in reducing the false negatives while balancing the proposed solution's performance.

20 Claims, 5 Drawing Sheets

(58) Field of Classification Search
CPC ........ G06F 21/566; G06N 20/00; G06N 3/08; H04L 63/1433; H04L 63/083
See application file for complete search history.

(56) References Cited

U.S. PATENT DOCUMENTS

| | | | | |
|---|---|---|---|---|
| 11,868,768 | B2 * | 1/2024 | Moran | G06F 18/2185 |
| 12,511,430 | B2 * | 12/2025 | Fanning | G06F 21/577 |
| 2021/0397697 | A1 * | 12/2021 | Kulaga | G06F 21/31 |
| 2022/0391491 | A1 * | 12/2022 | Gross | G06N 3/094 |

OTHER PUBLICATIONS

Han R, Gong H, Ma S, Li J, Xu C, Bertino E, Nepal S, Ma Z, Ma J. A credential usage study: flow-aware leakage detection in open-source projects. IEEE Transactions on Information Forensics and Security. Oct. 23, 2023;19:722-34. (Year: 2023).*

Runhan Feng et al.; "Automated Detection of Password Leakage from Public GitHub Repositories", 2022 IEEE/ACM 44th International Conference on Software Engineering (ICSE), IEEE, 12 pages (2022).

* cited by examiner

Combining, (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively — 310

Determining a confidence score for each potential password of the third set of potential passwords, using a likelihood of the associated potential password with one or more contexts in the third set of contexts — 312

Assigning a rank to each potential password in the third set of potential passwords, in association with the associated confidence scores, using a predefined ranking technique — 314

Validating an authenticity of a user to access the files containing the third set of potential passwords, based on presence of one or more potential passwords in the associated file, with the confidence score greater than a predefined threshold — 316

Creating a risk profile under (i) a user level associated with each machine, (ii) a machine level, and (iii) an enterprise level, based on the third set of potential passwords along with the associated ranks for reporting — 318

FIG. 3B

METHODS AND SYSTEMS FOR BUILDING RICH CONTEXT FOR EFFECTIVE PASSWORD DETECTION IN PLAINTEXT

PRIORITY CLAIM

This U.S. patent application claims priority under 35 U.S.C. § 119 to: Indian Patent Application number 202421015896, filed on Mar. 6, 2024. The entire contents of the aforementioned application are incorporated herein by reference.

TECHNICAL FIELD

The disclosure herein generally relates to cybersecurity analytics, and, more particularly, to methods and systems for building rich context for effective password detection in plaintext.

BACKGROUND

From an enterprise perspective, storage of password in plaintext on a computer hard disk (fixed or removable storage) is a serious concern, as hackers and penetration testers usually look for interesting files, especially the ones that trigger for automated searching (e.g., passwords, secrets). Frequently, these password files also store the location of the asset/service where the credentials are used (e.g., hostname, IP address, web URL). This could help a malicious agent to do privilege escalation, install a back-door, disable critical monitoring tools, and allows them lateral movement within the enterprise or an organization. Poorly picked and protected passwords continue to be one of the major sources of data breaches. Also, most types of malware profile hosts and scans networks for carelessly dumped plaintext password. In last 3 years, the global average cost of the data breach has increased by 15% and in 2023 the global average was about USD 4.45 million. Considering, the monetary impact and the exploitability of the plaintext password stored on the storage device, it is imperative for the organization to identify files containing plaintext passwords and securely quarantine/safeguard such files without causing disruption to users work routine.

However, detecting and securing plaintext passwords on hard-disk or storage device is difficult as humans generate passwords in a variety of idiosyncratic ways which results in high false negatives and involves a high computation cost as there are too many files to scan, tokenize and then analyze. Conventional techniques in detecting and securing the plain-text passwords can be divided into two categories: (1) password discovery with a context, and (2) password discovery without the context. The conventional techniques of password discovery without context primarily utilize techniques that try to learn some structural pattern from the known breached/leaked password datasets. As these breached datasets are large and consist of passwords created by humans, they do not represent the password creation habit of all humans (incompleteness of data). Also, there may be missing context for detecting password in plaintext (absence of context). Further, it contains a large number of irrelevant passwords from the perspective of an enterprise where a password composition policy is enforced.

The conventional techniques of password discovery with context uses additional side information to further help the password detection techniques to reduce the number of false positives and false negatives. The side information could come from an external source/file (e.g. wordnet, internet), from the proximity text (e.g. keywords, patterns), from simple file attribute (e.g. filename) and content structure/formatting itself (this includes algorithmic methods like program slicing for code files). However, all the techniques in this category are primarily designed for finding hardcoded passwords/tokens/access keys in a source code file, which is structured text with well-defined syntax and semantics.

SUMMARY

Embodiments of the present disclosure present technological improvements as solutions to one or more of the above-mentioned technical problems recognized by the inventors in conventional systems.

In an aspect, a processor-implemented method for building rich context for effective password detection in plaintext is provided. The method including the steps of: receiving a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models; simultaneously performing in a first pass, a first password scanning and a first context scanning, on the one or more files and the one or more folders present in each machine of the enterprise, using the plurality of configuration parameters, to obtain a first set of potential passwords and a first set of peripheral contexts respectively; performing in a second pass when the first set of potential passwords is empty and the first set of peripheral contexts is not empty, a second password scanning on the one or more files and the one or more folders present in each machine, using the plurality of configuration parameters, to obtain a second set of potential passwords; performing in the second pass when the first set of potential passwords is not empty and the first set of peripheral contexts is empty, a second context scanning on the one or more files and the one or more folders present in each machine, using the plurality of configuration parameters, to obtain a second set of content and proximity based contexts; combining (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively; determining a confidence score for each potential password of the third set of potential passwords, using a likelihood of the associated potential password with one or more contexts in the third set of contexts; assigning a rank to each potential password in the third set of potential passwords, in association with the associated confidence scores, using a predefined ranking technique; validating an authenticity of a user to access the files containing the third set of potential passwords, based on presence of one or more potential passwords in the associated file, with the confidence score greater than a predefined threshold; and creating a risk profile under (i) a user level associated with each machine, (ii) a machine level, and (iii)

an enterprise level, based on the third set of potential passwords along with the associated ranks for reporting.

In another aspect, a system for building rich context for effective password detection in plaintext is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models; simultaneously perform in a first pass, a first password scanning and a first context scanning, on the one or more files and the one or more folders present in each machine of the enterprise, using the plurality of configuration parameters, to obtain a first set of potential passwords and a first set of peripheral contexts respectively; perform in a second pass when the first set of potential passwords is empty and the first set of peripheral contexts is not empty, a second password scanning on the one or more files and the one or more folders present in each machine, using the plurality of configuration parameters, to obtain a second set of potential passwords; perform in the second pass when the first set of potential passwords is not empty and the first set of peripheral contexts is empty, a second context scanning on the one or more files and the one or more folders present in each machine, using the plurality of configuration parameters, to obtain a second set of content and proximity based contexts; combine (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively; determine a confidence score for each potential password of the third set of potential passwords, using a likelihood of the associated potential password with one or more contexts in the third set of contexts; assign a rank to each potential password in the third set of potential passwords, in association with the associated confidence scores, using a predefined ranking technique; validate an authenticity of a user to access the files containing the third set of potential passwords, based on presence of one or more potential passwords in the associated file, with the confidence score greater than a predefined threshold; and create a risk profile under (i) a user level associated with each machine, (ii) a machine level, and (iii) an enterprise level, based on the third set of potential passwords along with the associated ranks for reporting.

In yet another aspect, there are provided one or more non-transitory machine-readable information storage mediums comprising one or more instructions which when executed by one or more hardware processors cause: receiving a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models; simultaneously performing in a first pass, a first password scanning and a first context scanning, on the one or more files and the one or more folders present in each machine of the enterprise, using the plurality of configuration parameters, to obtain a first set of potential passwords and a first set of peripheral contexts respectively; performing in a second pass when the first set of potential passwords is empty and the first set of peripheral contexts is not empty, a second password scanning on the one or more files and the one or more folders present in each machine, using the plurality of configuration parameters, to obtain a second set of potential passwords; performing in the second pass when the first set of potential passwords is not empty and the first set of peripheral contexts is empty, a second context scanning on the one or more files and the one or more folders present in each machine, using the plurality of configuration parameters, to obtain a second set of content and proximity based contexts; combining (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively; determining a confidence score for each potential password of the third set of potential passwords, using a likelihood of the associated potential password with one or more contexts in the third set of contexts; assigning a rank to each potential password in the third set of potential passwords, in association with the associated confidence scores, using a predefined ranking technique; validating an authenticity of a user to access the files containing the third set of potential passwords, based on presence of one or more potential passwords in the associated file, with the confidence score greater than a predefined threshold; and creating a risk profile under (i) a user level associated with each machine, (ii) a machine level, and (iii) an enterprise level, based on the third set of potential passwords along with the associated ranks for reporting.

In an embodiment, the first password scanning is performed in the first pass, using the plurality of configuration parameters, to obtain the first set of potential passwords, through one or more of (i) a composition policy-based scanning, (ii) a frequency table based scanning, (iii) an entropy based scanning, and (iv) a deep learning based scanning.

In an embodiment, the first password scanning is performed through the composition policy-based scanning using the plurality of configuration parameters, in the first pass, to obtain a first sub-set of files and an associated first sub-set of potential passwords, the first password scanning is performed through the frequency table based scanning using the plurality of configuration parameters and by employing a trained frequency table, in the first pass, to obtain a second sub-set of files and an associated second sub-set of potential passwords, the first password scanning is performed through the entropy based scanning using the plurality of configuration parameters, in the first pass, by employing (i) word level analysis, (ii) line level analysis, (iii) a sentence level analysis, and (iv) a file level analysis, to obtain a third sub-set of files and an associated third sub-set of potential passwords, and the first password scanning is performed through the deep learning based scanning using the plurality of configuration parameters, in the first pass, by employing a trained deep learning model, to obtain a fourth sub-set of files and an associated fourth sub-set of potential passwords.

In an embodiment, the first context scanning is performed, using the plurality of configuration parameters, to obtain the first set of peripheral contexts through one or more of (i) a browser data-related scanning, (ii) an application name-related scanning, (iii) a file access and a data modification related scanning, and (iv) a file attribute scanning.

In an embodiment, the first context scanning is performed through the browser data-related scanning using the plurality of configuration parameters, in the first pass, to obtain a first sub-set of peripheral contexts, the first context scanning is performed through the application name-related scanning using the plurality of configuration parameters in the first pass, to obtain a second sub-set of peripheral contexts, the first context scanning is performed through the file access and the data modification related scanning, using the plurality of configuration parameters, in the first pass, to obtain a third sub-set of peripheral contexts, and the first context scanning is performed through the file attribute scanning using the plurality of configuration parameters, in the first pass, to obtain a fourth sub-set of peripheral contexts.

In an embodiment, the second password scanning is performed in the second pass, using the plurality of configuration parameters, to obtain the second set of potential passwords through one or more of (i) a trained machine learning (ML)-based classification model, and (ii) a pre-configured large language model (LLM).

In an embodiment, the trained ML-based classification model is obtained by: receiving a publicly available password dataset from a repository; extracting a plurality of valid sentences present in one or more files of the one or more folders present in each machine; creating a list of tokens by tokenizing each of the plurality of valid sentences or splitting each of the plurality of valid sentences with a predefined delimiter; pre-processing the list of tokens, using one or more pre-processing techniques, to obtain a pre-processed list of tokens; extracting a set of predefined features from each of (i) the publicly available password dataset and (ii) the pre-processed list of tokens, to obtain a labelled training data; and training a predefined ML-based classification model with the labelled training data using the plurality of configuration parameters, to obtain the trained ML-based classification model.

In an embodiment, the second context scanning is performed in the second pass, using the plurality of configuration parameters, to obtain the second set of content and proximity based contexts through one or more of (i) a LLM enriched path associated context scanning, (ii) a content based context scanning, and (iii) a proximity based context scanning.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A-3B illustrate exemplary flow diagrams of a processor-implemented method for building rich context for effective password detection in plaintext, using the system of FIG. 1, in accordance with some embodiments of the present disclosure.

DETAILED DESCRIPTION OF EMBODIMENTS

Figure 1:
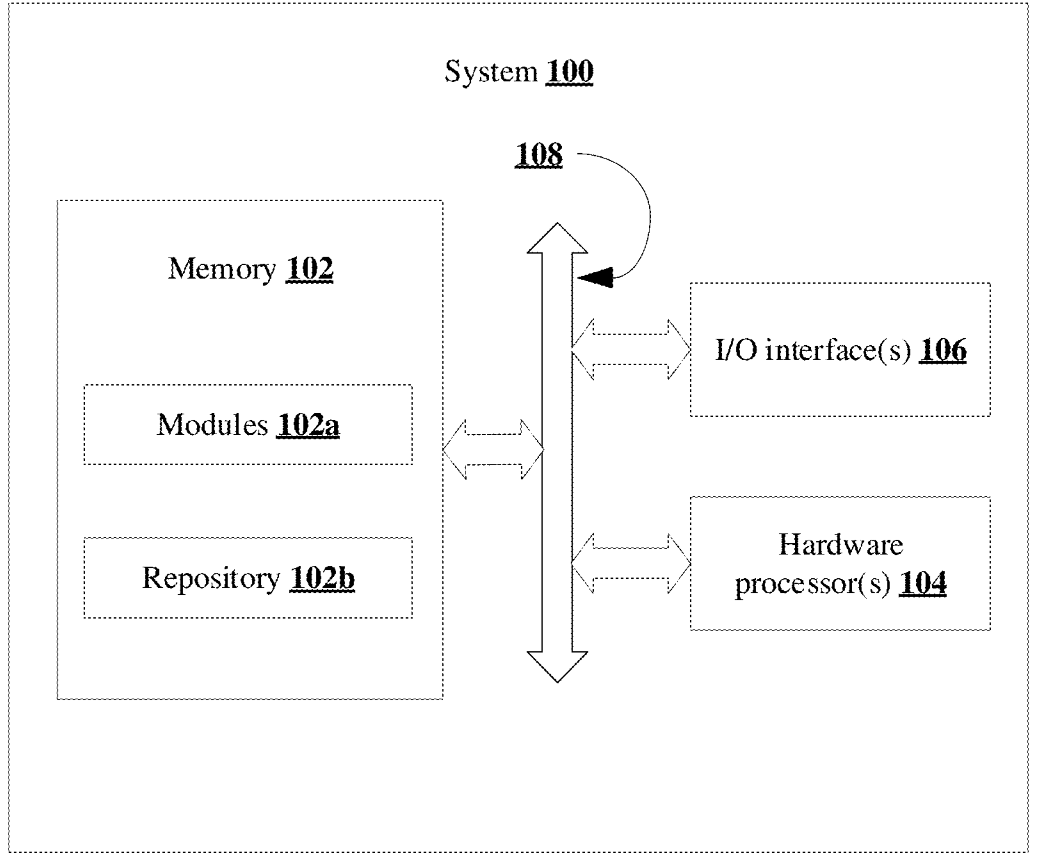
FIG. 1 is an exemplary block diagram of a system for building rich context for effective password detection in plaintext, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There are multiple ways to authenticate a human user, for example, one-time-passwords (OTP), facial recognition, behavioral biometric, fingerprint, and text-based passwords. Among these ways, the text-based passwords are the most prevalent form of authentication mechanism as they are simple, inexpensive, and convenient mechanisms to use and implement on various kind of devices and platforms. However, text-based passwords are also considered as the weakest way to authenticate the user. This is largely due to the fact that they are easy to guess or likely to be guessed by using dictionaries or using probabilistic context free grammar (trained on breached password dataset). To avoid creation of weak passwords and safeguarding an organization's assets, the system administrators commonly enforce a password composition policy which mandates to use or not use certain character classes (uppercase, lowercase, number and special symbols), minimum-maximum password length, password reuse policy (usually referred as history requirement) and password validity period.

However, it is observed that if password-composition policies are too restrictive in terms of acceptable password with length and class requirements, frequency of updates and no reuse of historical passwords then the users tend to adopt coping strategies that can reduce both security and productivity. These coping strategies vary from simple changes to old passwords (e.g. w1$dom1 to w1$dom2), use of memorable patterns (e.g. names, dates, location etc.) or worst store it on paper or hard-disk as plaintext. Some of these bad or insecure coping strategies could be addressed by educating users or applying smarter validations of the created passwords or adopting clean disk policy which involves removing any sensitive business information from the desk as frequently as possible.

Further, detecting and securing plaintext passwords on hard-disk or storage device is difficult as humans generate passwords in a variety of idiosyncratic ways which results in:

- High False Negatives as some passwords are simple dictionary words or names or places, and it is hard to distinguish them from a normal word used in a sentence, for example, 'password', 'manish', 'apple' etc., or, they are hard to parse until the underlying method is understood (keyboard walks like "1qaz2wsx3edc", words from song lyrics, etc.) or they could simply be a spelling mistake.
- High False Positives as depending on the context these words will mean something else, for example, 'CFolder::Int2Str' could be class method in C++ programming language that converts an integer to a string, even though it complies with 4 class policy (uppercase, lowercase, number, special character) and minimum length requirement of 8 characters and therefore appears to be a valid password.
- High computation cost as there are too many files to scan, tokenize and then analyze. Further, tokenization strategies are themselves costly as it could be a simple strategy which splits a sentence using whitespace or it could be a costly strategy wherein individual words are further tokenized in segments to analyze reuse or patterns. However, for a word consisting of N characters if iterated for each character, and choosen whether to include it in the current segment or start a new segment then it leads to $2^{(N-1)}$ possible segment sets. So, a simple word 'January2024!' will have 2048 segment sets of which only 1 set of segments is of use for actual analysis, that is, 'January', '2024' and '!'. In addition, there could be ambiguity due to possibility of multiple valid segments, for example, 'hearthand'→({'heart', 'hand'}, {'hearth', 'and'}, {'hear', 'than', 'd'}).
- No generic solution if a password is 100% randomly generated as there is no underlying algorithm to decide whether it is a password or not.

The existing solution in this area can be divided into two categories: (1) Password discovery without context, and (2) Password discovery with context. The existing strategies in Password discovery without context are primarily based on methods that utilize techniques that try to learn some structural pattern from the known breached/leaked password datasets as these breached datasets are large and consists of passwords created by humans, however:

- They do not represent the password creation habit of all humans (incompleteness of data).
- There is missing context for detecting password in plaintext (absence of context).
- It contains a large number of irrelevant passwords from the perspective of an enterprise where a password composition policy is enforced.

All this leads to overfitting of the model, wherein the trained model works well with the test data but performs badly on any external data. For example, consider a case where the model is trained on a dataset that contains a lot of samples consisting of passwords in lowercase alphanumeric strings, then it may learn to use presence of all lower-case characters and numbers in a word as a feature for classification, and may not recognize an uppercase alphanumeric string as password. Some of the existing techniques in this category with additional issues are:

- Regular Expression—It is not well-suited for enforcing complex password policies as it can result in complex and hard-to-read patterns. Difficulty in handling contextual rules such as not allowing sequential characters, avoiding repeated characters, or disallowing parts of the username in the password. Hard to adapt to evolving security standards as adapting regex patterns to meet new requirements can be cumbersome. Also, tends to have too many false positives and may result in end user frustration due to frequent false alarms. For example, the following regular expression looks for potential passwords that must consist of at least 8 characters and include characters from at least 4 of the character classes (uppercase, lowercase, number and symbols) in English language:

```
"^(?=(.*[A-Z]){1,})(?=(.*[a-z]){1,})(?=(.*\d{1,})(?=(.*[\W_]){1,})[A-Za-z\d\W_]{8,}$".
```

The given regular expression will identify both "P@ssw0rd!" and "CFolder::Int2Str" as password; despite the fact that the second string is a C++ class method. Also, it is cumbersome and error prone to include slight modifications, for example, for enforcing all four character class, minimum and maximum length between 8 and 64, no uppercase in the beginning and no number in the end results in the following regex:

```
"^(?![A-Z])(?=.*[a-z])(?=.*[A-Z])(?=.*\d)(?=.*[\W_])[A-Za-z\d\W_]{8,64}(?<![0-9]$".
```

- Probabilistic Context-Free Grammar—Designing and fine-tuning a PCFG for password policies can be complex and time-consuming, especially when defining rules that capture the intended security requirements without being too restrictive or too permissive. PCFGs can capture some context-based rules, however enforcing complex contextual rules may still be challenging, for example, avoiding common words. The technique is also prone to overfitting when finely tuned to a specific dataset or set of known passwords only. For a complex password composition policy, the resulting grammar becomes large and therefore poses challenges, both in terms of computation and storage. Also, the computational complexity of parsing each token of a file using PCFGs can be higher than other simpler password validation methods. Lastly, configuring PCFG is difficult and if not done properly it may result in large false positives and negatives, both of which could lead to end-user frustration and severe detrimental effect on the enterprise respectively.
- Heuristics—It relies on predefined rules and heuristics to identify a word as a potential password. The technique has limited adaptability to changing or evolving password policies. It is difficult capture user intent in terms of password or pattern reuse. Heuristics lack context awareness, making it difficult to identify passwords that depend on the user's context or behavior, for example, storing a single password in a file with brand/domain/ip address as name. Also, there is a risk of high false positives (classifying a normal word as password) or false negatives (rejecting actual password as normal word) as per the strictness of the heuristics. Therefore, striking the right balance between security and usability can be challenging and frustrating.
- Artificial Intelligence (AI)—The effectiveness of AI models depends primarily on the quality and representativeness of the training data. The AI model may inherit the biases and provide inaccurate classification if the training data is biased or incomplete. Usually, these issues lead to overfitting of the trained model. Further, it is difficult to capture user intent in terms of password or pattern reuse. It may require a subject matter expert to identify the appropriate features for training an effective and performant machine learning model. Also, machine learning and deep learning models often lack the explainability to provide meaningful feedback to users and security administrators. Also, there is a risk of high false positives (classifying a normal word as password) or false negatives (rejecting actual password as normal word) as per the representativeness and quality of data. Lastly, training and deploying sophisticated AI models can be resource-intensive especially in a resource constrained environment.

Most of the naive solutions are based on one of the above-mentioned techniques and usually tend to have high false positives and high false negatives. This leads to frustrated end-users and an organization exposed to cyber-attack.

The existing strategies in Password discovery with context use additional side information to further help the password detection techniques to reduce the number of false positives and false negatives. The side information could come from an external source/file (e.g. wordnet, internet), from the proximity text (e.g. keywords, patterns), from simple file attribute (e.g. filename, group, path, name, and so on) and content structure/formatting itself (this includes algorithmic methods like program slicing for code files). However, all solutions in this category are primarily designed for finding hardcoded passwords/tokens/access keys in a source code file, which is structured text with well-defined syntax and semantics.

The context analysis again utilizes the strategies discussed in Password discovery with context and have all the shortcomings mentioned in it. Recent solutions created for source code analysis usually extract context by analyzing some 'M' characters before and 'N' characters after the suspected password. Here, 'M' and 'N' are some configurable parameters. A recent 2022 paper named PassFinder tried to address this issue by extracting candidate password and corresponding context. The candidate password is sent to password guessing ML model, whereas context is sent to context model. Outputs of both these models are combined using ensemble methods to get the final output. The context was trained on a labelled dataset of surrounding text of a valid password. This approach reduces the number of FP and FN; however, there are few additional issues when dealing with context analysis in source code:

- Multiple variations of the context text are possible due to an individual's coding style. Other variations are also possible due to other reasons. Also, it is difficult to find all the variations of such a code snippet via manual context annotation by a subject matter expert within a large enterprise as it is highly time consuming, error prone and not cost effective.
- Requirement of a subject-matter-expert to identify the password string and annotate the context surrounding the password.

To address the additional issues mentioned above, past work has also looked at program analysis-based approaches. For example, in one of the prior-art, authors have looked at program slicing which involves extracting a subset of a program's code, known as a "slice" based on a specific criterion. It helps to focus on a portion of the code relevant to a particular computation, here, for context analysis. It is much more accurate than the pure text-based approaches; however, someone or someway is required to determine the slicing criterion and it requires dependency analysis for accurate analysis, could result in slice that may be too large to provide meaningful insights. Achieving precise and accurate slices can be challenging, especially in the presence of complex control flow, loops, and conditional statements. Slicing across function or method boundaries (inter-procedural slicing) adds complexity. It further has issues related to scalability and maintenance for large codebases. Also, program analysis-based approaches are usually more computing intensive and therefore have significant CPU and memory usage.

The problem of identifying the right context in free-flowing is even harder as there is no syntax or semantics associated with it. Also, password creation and storage also depend on user's personal preferences and biases, making the detection even harder in free-flowing text. A few past works tried to address this by utilizing external context, for example internet and WordNet. WordNet is a lexical database of the English language that groups words into sets of synonyms each expressing a distinct concept. However, the approach taken is constrained to multiple dimensions, for example, the internet-based approach uses 'Normalized Google Distance (NGD)' as a means for determining similarity between two keywords, thus establishing relationship between them. However, the approach is heavily biased for articles that are only indexed by Google search engine only and it also depends on the number of documents indexed on a particular topic. Additionally, NGD depends on the query provided to the search engine, web corpus, dynamic nature of internet. It has limited support for named entities (search engine may not have sufficient co-occurrence data), not suitable for all semantic relations and it is not transitive, for example if topics A=B and B=C then it is possible that A≠C. WordNet also has its issues, for example, it has coverage limitations, static nature, lack of semantic relations, difficulty in handling named entities and may suffer from semantic drift as the meaning or usage of words can change. For example, the word spam refers to a well-known food item/brand but in 1980s people start using it to describe certain abusive users who send unsolicited messages (spam) to large numbers of recipients, usually for advertisement. Additional challenges in handling free-flowing text includes:

- Minimal or no context available within the free-flowing text.
- Presence of noisy data along with actual password.
- No uniform behavior of storing the password, for example, storing just password in a file with filename as the username or domain/service/application name.

The present disclosure solves the technical problems in the art with the methods and systems for building rich context for effective password detection in the plaintext. The methods and systems of the present disclosure mainly focus is on identifying the right contexts that helps in reducing the number of false positives and number of false negatives and provide a way to secure access to files identified as containing potential passwords. Also, unlike prior work that aim to improve the detection method, the methods and systems of the present disclosure use simple and less computing intensive techniques for detecting potential passwords. In parallel, a stepped context analysis is performed which applies different context discovery strategies in sequential manner where execution of a step happens if the likelihood score of the previous step is more than a configured threshold. The step wise execution of context discovery helps in reducing the computational overheads as not all steps are executed in a single go (performance). It also helps in faster lookup (performance) and validation of a potential password against a context (false positive reduction). In scenarios, where a potential password is unable to find in a file using simple detection method, but if the context likelihood of the file is higher than the configured threshold then the file is searched again with more detailed techniques for detecting presence of a potential password. This selective second pass for a few files helps in reducing the false negatives while balancing the proposed solution's performance.

There are three main types of contexts that are considered under the multi-stepped analysis in the present disclosure. Each step could be classified as either simple or computing/network/cost intensive for the designed models. The three main types of contexts are a file-based context, a content-based context, and a proximity-based context.

In the file-based context, the basic attributes of a file are utilized to determine whether to inspect a file, and whether there is a possibility that the file may contain passwords. File attributes are pieces of information associated with every file and directory that includes additional data about the file itself or its contents. These attributes are helpful in reducing the number of potential candidate files that might contain passwords. The methods and systems of the present disclosure utilize the following file attributes: Filename, Timestamp, File Type, File Access, Size, Group, and Path. Calculating the context likelihood score from some of these attributes is very fast and some may have slight computing overhead.

In the content-based context, the complete content of the file is utilized to extract relevant context. Since file reading is involved here, this technique is slightly computing intensive. In this, the structure of the file is assessed in terms of content placement. It should be noted that the whitespace is used in the figures as the delimiter for separating different pieces of data. In practice a user may use other delimiters too, for example comma (',') or semicolon (';') or colon (':') etc. Additionally, a prefix tree of tokens is created which are between a configured minimum and maximum string length. For this, a tree-based or a hash-based data-structure is employed for locating specific keys from within a set. This acts as a lookup table for reducing false positives and also in identifying pattern reuse, for example, a text file may have C++ definitions like CFolder::FindFile, CFolder::DeleteFile and CFolder::CreateFile, if that is the case then the lookup table will help in identifying three different strings with common prefix 'CFolder::' and if the edit distance is above certain threshold then a language model is used to determine the meaning of the these tokens for further analysis and creating an audit trail. Lastly, a text to whitespace density calculation is performed, which essentially tries to calculate the likelihood of a line containing a password based on a line length and whitespace. A denser line is less likely to contain a password as it reduces the readability, whereas a less dense line would have higher chances of having password. This method helps in identifying passwords that are embedded in a denser text file.

In the proximity-based context, the text centered around a suspected password token is analyzed. Unlike the existing work on finding passwords in source code, one cannot simply train a deep learning model for this purpose as: 1) it is hard to get a labelled context dataset for training the model, and 2) even if one is obtained, it will not be a true representative dataset as password storage behavior is biased by personal preferences. Also, external sources like WordNet and internet cannot be used for supplying the side information for discovering a relevant context. Therefore, in the present disclosure, extra-linguistic features are used to identify a potential context, for example, proximity of a potential password candidate to an email address, username, ip address, URL etc.

Also, the present disclosure utilizes a proximity based relative entropy analysis for detecting any suspicious word. This approach helps in identifying words of relative importance, for example, it identifies 'delhi01.example.com' and 'WorldIs2Big!ForAnts' as suspicious words in the following sentence 'The secret word for the accessing the server delhi01.example.com is WorldIs2Big!ForAnts'. In addition, if the sentence or the line length is unusually dense (more characters with less spacing) then it is also analyzed with a language model (LM) for detecting any relationship between the words in the text and their relative importance. Once a context is discovered then it is further utilized to enhance the prediction capabilities of a natural language model by providing it as an additional input. For example, if a file with a the name 'delhi01.example.com.txt' contains a single word 'WorldIs2Big!ForAnts' then a language model or a large language model fails to identify the word 'WorldIs2Big!ForAnts' as suspicious as not sufficient context is provided. However, if the LM/LLM is provided with the following reformatted text (or prompt) then detection rate goes up: 'A file with name 'delhi01.example.com', which appears to be server name contains a single high entropy word (131.09 bits) WorldIs2Big!ForAnts in it.'. The name ('delhi01.example.com'), its type ('server') and its entropy ('131.09 bits') are calculated from the techniques discussed above. The use of the extralinguistic to come up with a well formatted human readable query to natural language model helps in improving the prediction rate of the LLM significantly.

Lastly, the present disclosure provides a kernel-based protection to files that are identified as potentially sensitive as they may contain password. The kernel-based protection module intercepts any reading and writing to identified sensitive files and first authenticate users by delegating the task to underlying operating system, for example, Integrated Windows Authentication (Kerberos, NTLM, NTLMSSP etc.), SAML (Security Assertion Markup Language) etc. These protocols authenticate users based on a challenge/response mechanism that proves to a server or domain controller that a user knows the password associated with an account. Usually this done on a separate desktop session, which an actual user could interact with, thus mitigating the chances of remote and scripted hacking or data exfiltration. A user is allowed to read/modify the files if the authentication is successful, otherwise a security incident is logged for further investigation/analysis.

Thus, the present disclosure provides a way to identify potential passwords in free-flowing plaintext files that are stored on a storage media. By free flowing refers that the text does not have any associated syntax and semantics, thus making password discovery very hard. The linguistic and extra-linguistic features are used to discover a context within which a word is used and therefore, classifying the word as a potential password or not. For this, a peripheral context, content-based context, and proximity context are used for analyzing whether a suspected word is actually a password or not. Further, the prediction performance of a natural language model (LM and LLM) is improved by generating a reformatted text input/prompt with embedded identified contexts. This approach helps in reducing the CPU and Memory usage significantly and helps in mitigating the number of false positives and false negatives. Finally, the kernel-based module is used for safeguarding files with potential passwords for minimizing the risk of leakage of sensitive content till the time the content is migrated to a safe repository and the file is purged or the protection is explicitly disabled by the user.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 is an exemplary block diagram of a system 100 for building rich context for effective password detection in plaintext, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface (GUI), and the like. The I/O interface(s) 106 may include a variety of software and hardware interfaces, for example, interfaces for peripheral device(s), such as a keyboard, a mouse, an external memory, a plurality of sensor devices, a printer, and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100 and methods of the present disclosure.

The repository 102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102*b* may be distributed between the system 100 and the external database.

Figure 2:
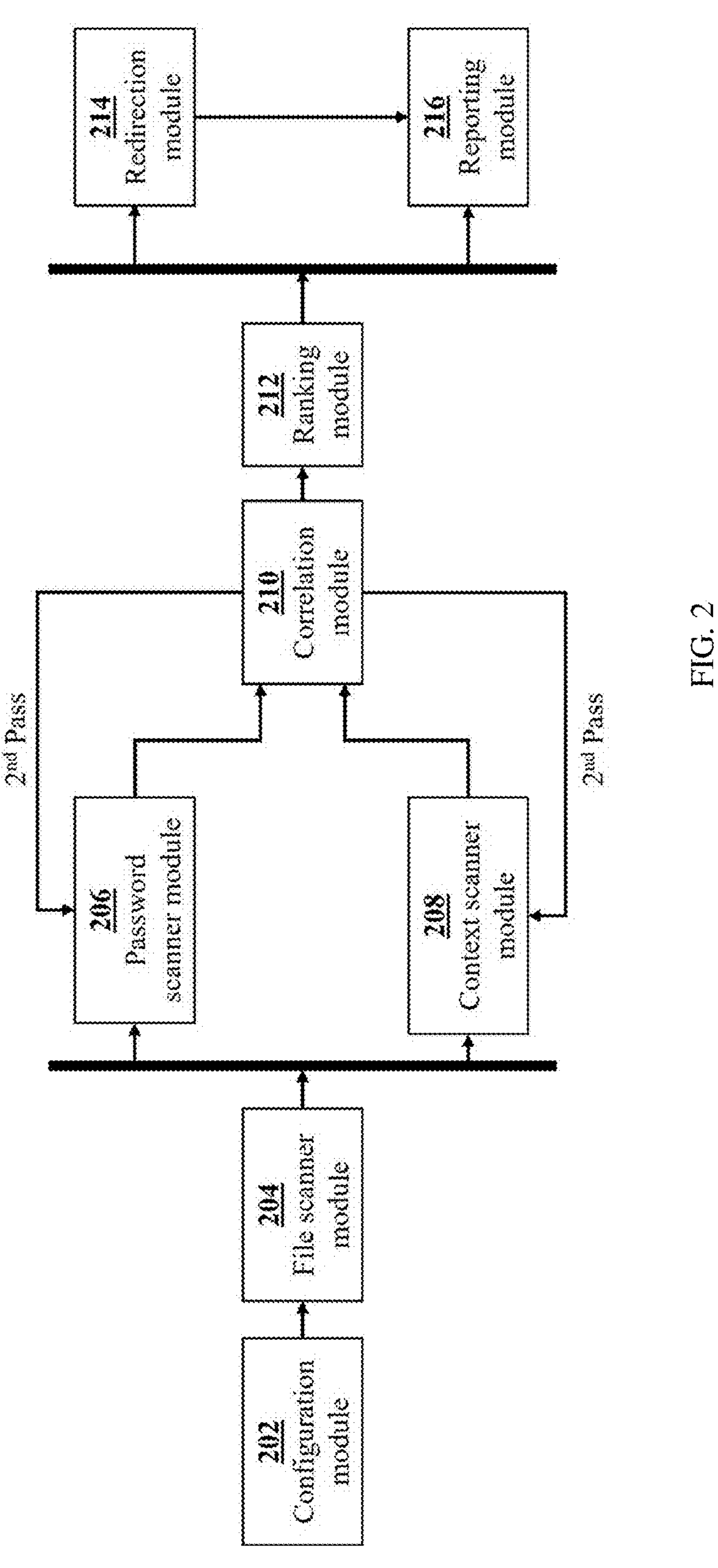
FIG. 2 is an exemplary block diagram illustrating a plurality of modules of the system of FIG. 1, for building rich context for effective password detection in plaintext, in accordance with some embodiments of the present disclosure.
Figure 3A:
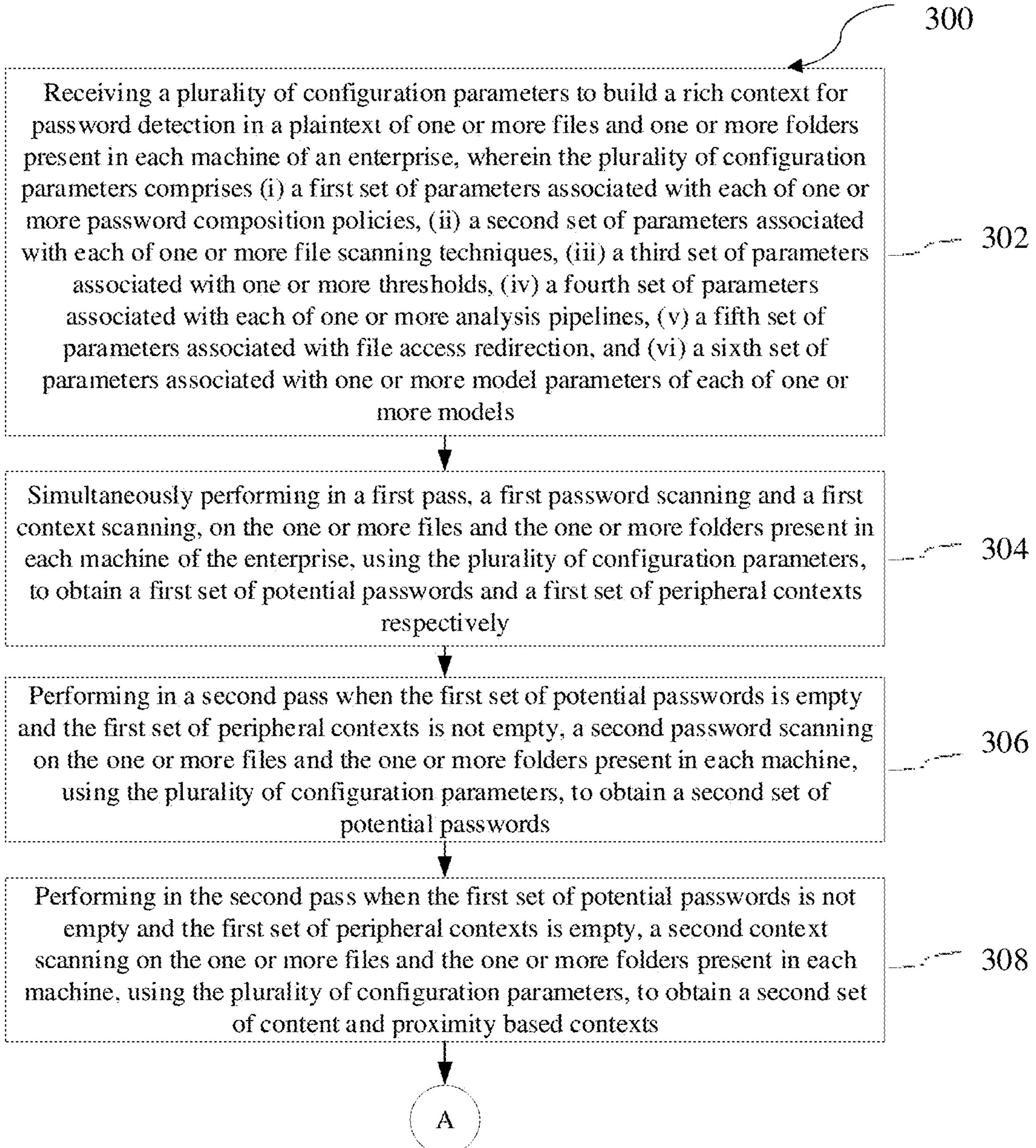

Referring collectively to FIG. 2 and FIGS. 3A-3B, components and functionalities of the system 100 are described in accordance with an example embodiment of the present disclosure. For example, FIG. 2 is an exemplary block diagram illustrating the plurality of modules 102*a* of the system 100 of FIG. 1, for building rich context for effective password detection in plaintext, in accordance with some embodiments of the present disclosure. In an embodiment, the plurality of modules 102*a* include a configuration module 202, a file scanner module 204, a password scanner module 206, a context scanner module 208, a correlation module 210, a ranking module 212, a redirection module 214, and a reporting module 216.

For example, FIGS. 3A-3B illustrate exemplary flow diagrams of a processor-implemented method 300 for building rich context for effective password detection in plaintext, using the system 100 of FIG. 1, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive a plurality of configuration parameters to build a rich context for effective password detection in a plaintext. The plaintext is present in one or more files and one or more folders present in each machine of an enterprise. The plurality of configuration parameters defines various operational and configurational parameters along with their values being used in the rest of the steps of the method 300.

The plurality of configuration parameters includes (i) a first set of parameters, (ii) a second set of parameters, (iii) a third set of parameters, (iv) a fourth set of parameters, (v) a fifth set of parameters, and (vi) a sixth set of parameters. The first set of parameters includes a set of parameters associated with each of one or more password composition policies defined by the enterprise and/or any other defining association. In an embodiment, one or more password composition policies are initialized or defined by one of (i) the enterprise password policy, (ii) National Institute of Standards and Technology (NIST) guideline, and any other defining association. In an embodiment, the configuration module 202 is configured to define the plurality of configuration parameters.

More specifically, the enterprise provided password composition policy specifies the expected password requirements from the enterprise perspective. This helps in reducing the processing time if the enterprise is only interested in safeguarding its own assets and devices. In case if it is not provided then the basic length requirement given in the NIST guideline is used, which increases the processing time but helps in identifying larger set of credentials stored in free flowing plaintext. The increase in processing time is due to the computation required to distinguish between password and non-password words. An enterprise could reduce this time while scanning for enterprise and non-enterprise credentials by omitting 'char_class' and setting 'min_char_class' to 2. In this situation, the user could provide an additional step of 'line_analysis' in 'pipe_sec_pwd' which analyzes each line at logical and actual boundaries. The logical boundary is when a line is terminated by punctuation, whereas actual boundary is where a new linefeed character occurs (that is, \n, \r\n etc.).

The second set of parameters includes a set of parameters associated with each of one or more file scanning techniques that are used for scanning files such as file type, techniques used for scanning, and so on. More specifically, the file scanner module 204 utilizes these second set of parameters for scanning a disk of the local machine for files, to analyze using the file type and scanning techniques.

More specifically, the one or more file scanning techniques (alternatively referred as disk scanning techniques) directs the file scanner module 204 to use an appropriate implemented way for scanning the disk for files to analyze. This is done by setting the 'extensions' and 'scan_technique' fields under the 'scanning' section. The 'extensions' allow a security administrator to configure the file-types that may contain sensitive data. Usually, this should contain the usual file extensions that the user can create and modify. The 'scan_technique' field allows the user to select the scanning method, for example, a simple method using the user mode application programming interface (API) provided by the user-mode libraries or software development kit (SDK). This technique is generic and is guaranteed to work on all architectures and operating systems. On the contrary, 'native' method uses OS specific APIs to enumerate all the files on filesystem. The native works fast but has portability issue. For example on Windows, the Master File Table (MFT) based approach is used for the 'native' setting and will not work for Linux OS.

The third set of parameters includes a set of parameters associated with one or more thresholds. The third set of parameters defines the one or more thresholds such as a minimum and a maximum file size in bytes, entropy cut-off, number of characters to analyze around (pre and post) the suspected password, and so on. These thresholds help in filtering and other analysis.

The fourth set of parameters includes a set of parameters associated with associated with each of one or more predefined analysis pipelines to be used for password and context identification. The pipelines detail the first pass and second pass pipelines for password and context identification. Each pipeline contains a set of steps and the order of execution of the steps is determined by their order in the pipeline.

The fifth set of parameters includes a set of parameters associated with file access redirection. More specifically, the fifth set of parameters are related to authentication protocols, maximum authentication attempts, and cool down time in seconds in which a user exhausts all the available authentication attempts. There is a provision to save the last attempt timestamp on a remote server and appropriate OS facilities, for example, registry in Windows OS. Max attempts and cool down helps in discouraging any type of attack automation. The redirection module 214 utilizes these set of fifth parameters associated with file access redirection.

The sixth set of parameters includes a set of parameters associated with one or more model parameters of each of the one or more models. The one or more models includes the standalone models, Machine learning (ML)-based algorithms (models) such as RandomForest (RF), Light-Gradient boosting machine (GBM), Support Vector machine (SVM), Decision Tree, NaiveBayes, Artificial Intelligence (AI)-based models, large language models (LLM), and so on. More specifically, the sixth set of parameters of each model includes the parameters machine for second pass analysis.

At step 304 of the method 300, the one or more hardware processors 104 of the system 100 are configured to simultaneously perform in a first pass, a first password scanning and a first context scanning, to obtain a first set of potential passwords and a first set of peripheral contexts respectively. The first password scanning and the first context scanning is performed on the one or more files and the one or more folders present in each machine of the enterprise.

The plurality of configuration parameters received at step 302 of the method 300 are utilized while performing the first password scanning and the first context scanning. For example, the one or more file scanning techniques and associated second set of parameters are utilized the first scan for the first password scanning and the first context scanning. Similarly, the one or more analysis pipelines if predefined and the associated fourth set of parameters are utilized to perform the first password scanning and the first context scanning.

The main objective of the first pass is to scan the one or more files and the one or more folders such that the potential passwords and the peripheral contexts that provide the context about the potential passwords that are present in the files and the folders. Hence, the first set of potential passwords may contain one or more potential passwords if present in the files and the folders. Similarly, the first set of peripheral contexts may contain one or more peripheral contexts if present as contexts in the files and the folders, that provide the context to the potential passwords.

The first password scanning is performed in the first pass, using the plurality of configuration parameters, to obtain the first set of potential passwords, through the one or more file scanning techniques comprising a composition policy-based scanning, a frequency table based scanning, an entropy based scanning, and a deep learning based scanning. For example, only the composition policy-based scanning is performed using the first set of parameters associated to that password composition policy. In another example, the frequency table based scanning along with the third set of parameters associated with the one or more thresholds and the deep learning based scanning along with the sixth set of parameters associated with one or more model parameters is performed using one of the analysis pipeline along with corresponding fourth set of parameters.

The composition policy-based scanning uses the following logic to classify a given word as potential password or not. The composition policy-based scanning (of the first password scanning) is configured in the first pass to perform the scanning of one or more files and the one or more folders present in each machine, using the plurality of configuration parameters, to obtain an associated first sub-set of potential passwords and the first sub-set of files where the first sub-set of potential passwords are identified.

Below is the pseudocode for executing the composition policy based potential password detection:

```
1: procedure UseCompositionPolicy (config, file, delimiter = [‘ ’, ‘\t’])
2:    min_len = config[“composition_policy”][“min_pwd_len”]
3:    max_len = config[“composition_policy”][“max_pwd_len”]
4:       tokens = split_file_content(file, delimiter) //Splits file text
      in tokens using delimiter
5:    classes = {“upper”:false, “lower”:false, “number”:false,
“symbol”:false}
6:    pwd_map = { }
7:    while tokens is not empty do
8:       token = next(tokens)
9:       counter, sample_space, len = 0, 0, length(token)
10:       if len < min_len or len > max_len then
11:          continue
12:       end if
13:       for ch ∈ token do
14:          if ch is lower then
15:             classes[“lower”] = true
16:          else if ch is upper then
17:             classes[“upper”] = true
18:          else if ch is number then
19:             classes[“number”] = true
20:          else
21:             classes[“symbol”] = true
22:          end if
23:       end for
24:       if classes[“lower”] == true then
25:          counter += 1
26:          sample_space += alphabets //for english
language, alphabets = 26
27:       end if
28:       if classes[“upper”] == true then
29:          counter += 1
30:          sample_space += alphabets //for english
language, alphabets = 26
31:       end if
32:       if classes[“number”] == true then
33:          counter += 1
34:          sample_space += numbers //numbers = 10
35:       end if
36:       if classes[“symbol”] == true then
37:          counter += 1
38:          sample_space += symbols //for US keyboard,
symbols = 32
39:       end if
40:       if counter >=
```

-continued

```
config[“composition_policy”][“min_char_class”] then
41:          entropy = len * log2 (sample_space)
42:          pwd_map[token] = {“entropy”:entropy} //scored on
diff dimensions
43:       end if
44:    end while
45:    return (file, pwd_map)   //tuple of file and potential password
map
46: end procedure
```

Similarly, the frequency table based scanning (of the first password scanning) is configured in the first pass to perform the scanning of one or more files and the one or more folders present in each machine, using the plurality of configuration parameters, and by employing a trained frequency table, to obtain an associated second sub-set of potential passwords and the second sub-set of files where the first sub-set of potential passwords are identified.

The frequency table based scanning approach uses an actual password database for learning the actual password creation behavior of a user. Depending upon the requirement, the frequency table is trained either using the enterprise password dataset or a publicly available dataset like RockYou or Xato. The training process includes reading the password dataset, filtering out the passwords that do not fulfil the password length requirements. In an embodiment, the training may happen on a central server and retraining is required as and when the password dataset changes significantly or posts a new password composition policy is enforced by the enterprise. The trained frequency table is then deployed on individual systems along with other models for password and context discovery.

Below is the pseudocode for reading a password dataset for training a frequency table:

```
1:    procedure ReadPasswordFile (config, file)
2:       min_len = config[“composition_policy”][“min_pwd_len”]
3:       max_len = config[“composition_policy”][“max_pwd_len”]
4:       fp = open(file)
5:       pwds, lengths = [ ], [ ]
6:       while true do
7:          line = read_line(fp)
8:          if line == null then
9:             break
10:          end if
11:          length = length(line)
12:          if length < min_len or length > max_len then
13:             continue
14:          end if
15:          pwds.append(line)
16:          lengths.append(length)
17:       end while
18:       return (pwds, lengths)
19:    end procedure
```

Below is the pseudocode for training the frequency table for potential the password detection:

```
1:    procedure TrainFreqTable (config; file; delimiter = [‘ ’, ‘\t’])
2:          freq_table = {“count_upper” : 0.0, “count_lower” : 0.0,
“count_special” : 0.0,
         “count_number” : 0.0, “avg_length” : 0.0, “avg_entropy” : 0.0,
“avg_repeating_chars” :
         0.0, “avg_sequences” : 0.0, “avg_transitions” : 0.0 }
3:       entropies, transitions, repeating, sequences = [ ], [ ], [ ], [ ]
4:       pwds, lengths = ReadPasswordFile(file)
5:       all_characters = sum(lengths)
6:       step_score = 1.0/all_characters
```

```
7:      for pwd ∈ pwds do
8:        for ch ∈ pwd do
9:          if ch in freq_table then
10:           freq_table[ch] += step_score
11:         else
12:           freq_table[ch] = step_score
13:         end if
14:         if ch is lower then
15:           freq_table["count_lower"] += step_score
16:         else if ch is upper then
17:           freq_table["count_upper"] += step_score
18:         else if ch is number then
19:           freq_table["count_number"] += step_score
20:         else
21:           freq_table["count_special"] += step_score
22:         end if
23:       end for
24:       repeating.append(RepeatingChars(pwd)) //e.g. in
Maaarcch@122 it is 3
25:       entropies.append(CalcEntropy(pwd)) //As shown in
UseCompositionPolicy pseudo code
26:       transitions.append(CalcTransitions(pwd)) //e.g. in
P@ssw0rd5 it is 6
27:       sequences.append(CalcSequences(pwd)) //e.g. in
Paaabc@12$567 is 3
28:     end for
29:     freq_table["avg_length"] = average(lengths)
30:     freq_table["avg_entropy"] = average(entropies)
31:     freq_table["avg_repeating_chars"] = average(repeating)
32:     freq_table["avg_sequences"] = average(sequences)
33:     freq_table["avg_transitions"] = average(transitions)
34:     return freq_table
35:   end procedure
```

Below is the pseudocode for using a frequency table for password detection:

```
1: procedure DetectPassword (config, file, freq_table)
2:    pwds, lengths = ReadPasswordFile(file)
3:    suspects = { }
4:    for pwd ∈ pwds do
5:      last_class, curr_class = None, None
6:      result = {"entropy" : CalcEntropy(pwd)), "likelihood" : 0.0}
7:      for ch ∈ pwd do
8:        if ch is lower then
9:          curr_class = "count_lower"
10:       else if ch is upper then
11:         curr_class = "count_upper"
12:       else if ch is number then
13:         curr_class = "count_number"
14:        else
15:         curr_class = "count_special"
16:         result["likelihood"] += freq_table[ch]
17:       end if
18:       if last_class != curr_class then
19:         last_class = curr_class
20:          if (curr_class == "count_upper") or (curr_class ==
"count_number") then
21:           result["likelihood"] += freq_table[curr_class]
22:         end if
23:       end if
24:     end for
25:     rep_chars = RepeatingChars(pwd)
26:     tran_class = CalcTransitions(pwd)
27:     seq_chars = CalcSequences(pwd)
28:     if rep_chars > freq_table["avg_repeating_chars"] then
29:       result["likelihood"] += freq_table["avg_repeating_chars"]
30:     end if
31:     if tran_class > freq_table["avg_transitions"] then
32:       result["likelihood"] += freq_table["avg_transitions"]
33:     end if
34:     if seq_chars > freq_table["avg_sequences"] then
35:       result["likelihood"] += freq_table["avg_sequences"]
36:     end if
37:     if result["likelihood"] > config["thresholds"]["pwd_likelihood"]
then
38:       suspects.add((pwd, result))
```

```
39:       end if
40:     end for
41:     return (file, suspects)
42: end procedure
```

Similarly, the entropy based scanning (of the first password scanning) is configured in the first pass to perform the scanning of one or more files and the one or more folders present in each machine, using the plurality of configuration parameters, and by employing one or more of (i) word level analysis, (ii) line level analysis, (iii) a sentence level analysis, and (iv) a file level analysis, to obtain an associated third sub-set of potential passwords and the third sub-set of files where the first sub-set of potential passwords are identified.

The entropy based scanning utilizes the idea that users often try to create non-obvious but memorable passwords. Memorability comes from the usage of a dictionary word, known fact or patterns, whereas the variability comes from mixing different class types, for example, 'Spring@2024' is a combination of all four-character classes, yet memorable. However, variability does not always guarantee a strong password. For detection, the total sample space(S) is required, which is a sum of sample space of individual character class, and the length of the password (L). Given this, the entropy of a word 'w' is calculated as: $E(w)=L_w \times \log_2 S_w$. For English language and QWERTY keyboard, there 26 keys for lowercase, 26 keys for uppercase, 10 keys for numbers and 32 keys for symbols. Therefore, the total sample space S from which a password could be created is 94. The NIST guideline mentions minimum 8-character password and maximum 64 characters. Based on this, the weakest password of 8 characters will have 26.57 bit entropy (password consisting of numbers only), whereas the strongest password of 8 character will have an entropy of 52.44 bits (password with all classes). It is assumed that the user passwords are chosen uniformly at random from the sample space, which is rarely the case and therefore the need for a robust context detection method.

The word level analysis approach splits the whole document into tokens by using the provided delimiter. These tokens are first filtered on the basis of maximum and minimum password length. Post this, the entropy of the remaining tokens is calculated and compared with an appropriate threshold. For example, the average entropy calculated during frequency table training ('freq_table["avg_entropy"]'), or the entropy threshold set by the security administrator in the configuration is used.

The line level analysis approach extracts individual lines from the file for analysis. To ensure performance, lines above a certain length (the limit can be set in the threshold) are filtered. The remaining lines are individually analyzed by splitting them into the list of tokens and then calculating entropy of each of the tokens. Then the mean (μ) and standard deviation (σ) of entropies of all tokens are calculated in a given line. Next a token as marked suspected password if its entropy (∈) is above a calculated threshold, that is, $\in \geq (\mu+\theta\times\sigma)$. Here, θ is a configurable parameter and usually θ=2 works fine for identifying a potential password.

The sentence level analysis approach is similar to the line level analysis approach, however here a valid sentence is considered for the analysis. The sentence extraction can be performed using a LLM or well-known NLP libraries, for example, Spacy and Flair. The file level analysis is also similar to the line level analysis approach but instead considers the whole document is used for μ and σ calculation.

More specifically, in the present disclosure, a relative entropy comparison is employed for password detection. Even though the idea of entropy is well-known for calculating password strength and discarded due to some weakness, for example, people tend to adopt coping strategies for complying with high entropy (strong password) requirements. However, for detecting uneven information distribution and specially for detecting password, entropy is a very good technique, for example, in the sentence 'the password for accessing the server payment.example.net is W1$d0m@Night' the underlined tokens standout due to higher entropy then the rest.

Similarly, the deep learning based scanning (of the first password scanning) is configured in the first pass to perform the scanning of one or more files and the one or more folders present in each machine, using the plurality of configuration parameters, and by employing a trained deep learning model, to obtain an associated fourth sub-set of potential passwords and the fourth sub-set of files where the first sub-set of potential passwords are identified.

For the deep learning based scanning, the password identification is modelled using the deep learning (DL) model as a binary classification problem, which is a type of supervised learning problem where the goal is to predict one of two possible outcomes based on a set of input features. The intuition here is to distinguish between a common word and an actual password. For training the deep learning model, the publicly available large breached password datasets is used, as well as the enterprise password dataset which is specific to the password composition policy of the enterprise. For normal or benign words, a common large data set is created by processing the documents in enterprise's document management system. Creating this document locally (within the enterprise) is critical as helps in capturing enterprise specific vocabulary. It is also possible to create role and project specific vocabularies for getting more accurate results, however generic models are usually sufficient and the gap in the accuracy when compare with the role/project specific vocabulary is compensated by other models. Once the enterprise specific vocabulary is created, then the dataset is processed by removing words with entropy higher than a particular threshold. This is done to avoid unexpected strings like project, request and employee IDs, that is, items with high entropy and high-class transition. Also, during first pass, even though training the DL model is computing intensive, as the training happens on a central server and only the trained model is deployed.

There are various DL models that can be utilized for the binary classification problem stated above. For example, due to sequential nature of the text content Recurrent Neural Networks (RNN) are suitable, making them appropriate for processing words in a sentence. Long Short-Term Memory (LSTM) and Gated Recurrent Unit (GRU) can be used as popular variant of RNNs with vanishing gradient problem addressed and allowing them to capture longer-term dependencies in the text (sentence/lines). Also, the bidirectional LSTMs have been shown to be effective for this task as they process the input data in both forward and backward directions, which enables the model to capture information from both past and future contexts, which can be beneficial for password detection. There are other techniques too, for example, Convolutional Neural Networks (CNNs), Transformer models (such as Bidirectional Encoder Representations from Transformers (BERT)) and embedding based models like Word2Vec and Glove.

If more than one file scanning technique is employed in the first pass, then the corresponding sub-sets of potential passwords are combined to obtain the first set of potential passwords. For example, if both the composition policy-based scanning and the entropy based scanning are performed, then the first sub-set of potential passwords and the second sub-set of potential passwords are combined to obtain the first set of potential passwords. The number of file scanning techniques and the type of the file scanning techniques are intelligently chosen based on the type of machine, properties of machine files, and so on.

Context discovery helps in reducing the number of false positives and false negatives. The first context scanning is performed in the first pass, using the plurality of configuration parameters, to obtain the first set of peripheral contexts, through the one or more file scanning techniques comprising (i) a browser data-related scanning, (ii) an application name-related scanning, (iii) a file access and a data modification related scanning, and (iv) a file attribute scanning. For example, only browser data-related scanning is performed to obtain the first set of peripheral contexts. In another example, both the application name-related scanning and the file attribute scanning are performed using one of the analysis pipelines along with corresponding fourth set of parameters to obtain the first set of peripheral contexts.

The browser data-related scanning (of the first context scanning) is configured in the first pass to perform the scanning of one or more files and the one or more folders present in each machine, using the plurality of configuration parameters, to obtain a first sub-set of peripheral contexts.

Most of the browsers use SQLite database for storing browsing related data. For such scenarios, the SQLite API is utilized for directly extracting the visited domains and their timestamp. For example, this approach is used for extracting relevant data for Google Chrome browser or Microsoft Edge browser. In case the browser on user's machine does not use SQLite database then a temporary add-on is added to user browser which communicates with the application using well-documented Google Chrome's or Microsoft Edge's native messaging API or using asynchronous HTTP calls using AJAX (e.g., fetch or XMLHTTPRequest) API for communicating with local or external hosted service.

Similarly, the application name-related scanning (of the first context scanning) is configured in the first pass to perform the scanning of one or more files and the one or more folders present in each machine, using the plurality of configuration parameters, and by employing a trained frequency table, to obtain a second sub-set of peripheral contexts.

Application Name. Application names are used to figure whether a file name is similar or near similar to an application name. For example, a file with 'putty.txt' may have data related to PUTTY, which is a free and open-source terminal emulator, serial console, and network file transfer application. Application names are extracted in the following ways:

- Using OS specific files and folders—This involves referencing and extracting relevant information from OS specific files. For example, on Windows OS the name of the executed applications is extracted from the 'prefetch' folder. The Prefetch folder is a part of Windows optimization mechanisms, and it helps improve the startup time and overall performance of applications by preloading necessary data. Similarly, on Linux OS, such information is extracted from the shell '.history' file, for example, '.bash_history' on bash shell.

Using command lines—the list of installed applications are extracted by using the well-known and well-documented command lines, for example, on Windows OS, 'Windows Management Instrumentation (WMI)' is used for this: "wmic product get name, version". Similarly, on Linux, package-manager specific commands are used to get the desired result, for example, on Debian based distributions 'dpkg-list' or "rpm-qa" on Red Hat based distributions.

Enumerating running applications by using programming language specific APIs. The extracted name and timestamp can be correlated with the file name and file access behavior of the user, which may indicate storage of application specific data inside the file.

Similarly, the file access and the data modification related scanning (of the first context scanning) is configured in the first pass to perform the scanning of one or more files and the one or more folders present in each machine, using the plurality of configuration parameters, to obtain a third sub-set of peripheral contexts.

The file access and the data modification related scanning is done by using OS specific APIs. In an embodiment, 'inotify' is used on Linux systems to monitor file system events. It is a kernel subsystem on Linux that provides an interface for monitoring filesystem events such as file creation, modification, and deletion. Similar APIs are used on Windows OS (ReadDirectoryChangesW) and on macOS (FSEvents API). The above-mentioned techniques are more suitable for real-time monitoring of specific directories, while there are other options for accessing more comprehensive auditing framework for system-wide monitoring; however, they require elevated privilege. For example, on Linux a way is implemented to access the Linux Audit Framework (auditd), which allows to monitor system calls, including filesystem-related events. For performance reasons only the filesystem events are monitored and filters out the other events. On Windows OS, a more specific NTFS Change journals APIs is utilized. The important data extracted from this includes filename, path, access timestamp, reason (create, access, edit or delete), and modification timestamp. This data is utilized for calculating frequency of file access and file modification, which are relevant for extracting peripheral context.

Similarly, the file attribute scanning (of the first context scanning) is configured in the first pass to perform the scanning of one or more files and the one or more folders present in each machine, using the plurality of configuration parameters, to obtain a fourth sub-set of peripheral contexts. In the file attribute scanning, the basic file attributes are collected for calculating the peripheral contexts. Some of the contexts in this category are calculated during the first pass as they are less computing intensive, require no I/O activity and require no access to network. Although some of them require additional analysis, thus increased processing time, but with increased accuracy. Data points that are captured or utilized are:

Filename—Used for determining the nature of the filename. It is done by testing the name for resemblance to IP address, server name, network device, application name and domain name. The testing is done by using a combination of regular expression and lookup tables (e.g. process name, domain name etc.).

Timestamp—In case it is unable to extract the extra information related to 'File Access and Modification Data', then the file access and modification timestamps are utilized for correlation with the application and domain access data.

FileType—It is used to identify the actual type of the file. This is done by detecting the actual MIME type of the file by analyzing initial 1 or 2 KB of data. There are already well-established libraries which can help with this task.

FileAccess—Determines whether a file is system file, hidden file, read-only file or a normal file. A hidden file with write access has higher chances of storing sensitive data. It is used for calculating the likelihood score. The files with system and read-only access type can be safely ignored.

Size—It is a simple context that can be utilized for filtering out files that are large in size. The intuition here is that the users tend to have a small sparse file for storing authentication related data for easy accessibility and readability.

Group—This is used as an indication that the file is accessible by multiple users on the device. If the context likelihood score or password likelihood or both are high, then this indicates a more serious issue of shared credentials. Accordingly, the contribution of this field varies from 0 to 2 (for boosting the score).

Path—This attribute is used in first and second pass both. In the first pass, the path attribute is used to determine whether the file is stored at a location specific to the user account or not. For example, for a given user 'Alice' and on Windows OS, the path 'C:\Users\Alice\Documents' refers to a location which is accessible by the user 'Alice' or a system administrator. Whereas the 'C:\Alice\Documents' is accessible by anyone with account on the device.

If more than one file scanning technique is employed in the first pass, then the corresponding sub-sets of peripheral contexts are combined to obtain the first set of peripheral contexts. For example, if both the browser data-related scanning and the file attribute scanning are performed, then the first sub-set of peripheral contexts and the fourth sub-set of peripheral contexts are combined to obtain the first set of peripheral contexts. The number of file scanning techniques and the type of the file scanning techniques are intelligently chosen based on the type of machine, properties of machine files, and so on.

If both the first set of potential passwords and the first set of peripheral contexts are empty (null sets), then the corresponding machine does not contain any potential passwords and the contexts, and such machine is marked as safe as no potential passwords, and the contexts are detected in plain text.

At step 306 of the method 300, the one or more hardware processors 104 of the system 100 are configured to perform in a second pass, a second password scanning on the one or more files and the one or more folders present in each machine, to obtain a second set of potential passwords. The second password scanning in the second pass is performed only when the first set of potential passwords obtained at step 304 of the method 300 is empty (a null set), but the first set of peripheral contexts obtained at step 304 of the method 300 is not empty (not a null set). The plurality of configuration parameters received at step 302 of the method 300 are utilized while performing the second password scanning.

The main objective of the second password scanning in the second pass is to identify the potential passwords that are missing in the first pass. Hence, the second set of potential passwords may contain one or more potential passwords if present in the files and the folders. The second is pass is performed when the techniques in the first pass do not provide any potential password candidates; however, the context scanner module 208 return contexts with high likelihood scores. These help in reducing the number of false negatives.

The second password scanning is performed in the second pass, using the plurality of configuration parameters, to obtain the second set of potential passwords, through the one or more file scanning techniques comprising (i) a locally trained machine learning (ML)-based classification model, and (ii) a pre-configured large language model (LLM). If more than one file scanning technique is employed in the second pass, then the corresponding sub-sets of potential passwords are combined to obtain the second set of potential passwords.

The trained machine learning (ML)-based classification model is used in the second scan with the intuition that the deep learning model deployed in the first pass is too generic to distinguish between a normal word and a password for a given user on the given machine. This happens if there is a new role or department created and there are no representative documents in the enterprise's document management system.

In an embodiment, the trained machine learning (ML)-based classification model is obtained by training a predefined ML model with the suitable training data. The training process is explained through the steps below. In the first step, a publicly available password dataset is received from repository 102*b*. In the second step, a plurality of valid sentences present in each of the one or more files of the one or more folders present in each machine are extracted. In an embodiment, a valid sentence means a sentence that complies with the given language grammar.

In the third step, a list of tokens is created by tokenizing each of the plurality of valid sentences or splitting each of the plurality of valid sentences obtained in the second step, with a predefined delimiter. In the fourth step, the list of tokens created in the third step are pre-processed using one or more pre-processing techniques, to obtain a pre-processed list of tokens.

In the fifth step, a set of predefined features from each of (i) the publicly available password dataset and (ii) the pre-processed list of tokens, are extracted to obtain a labelled training data. In the sixth and the last step, a predefined ML-based classification model is trained with the labelled training data using the plurality of configuration parameters, to obtain the trained ML-based classification model. Further, the trained ML-based classification model is validated using the test dataset before consumption.

More specifically, a list of locally available documents is extracted first from the repository 102*b*. For this the tool we documents is used which captures a user's area of work, for example, Microsoft Office Documents (DOCX, PPTX, XLSX etc.), Open Office Documents (ODT, ODS, ODP etc.), simple text files and PDF. The documents are processed to extract valid sentences using the NLP libraries. These sentences are then tokenized to create a list of unique tokens (bag of words). Another technique to create a list of unique tokens is by simply splitting the text content using a provided delimiter, although it may have non-text tokens too, therefore a noisy method. Once the enterprise specific vocabulary is created, then this dataset is pre-processed by removing words with entropy higher than a particular threshold. This is done to avoid unexpected strings like project, request, and employee ids, that is, items with high entropy and high-class transition.

Once the dataset is prepared then the breached password dataset is created along with the locally curated dataset of normal words to train an appropriate machine learning model. The features include, but are not limited to these, are length, entropy, transition, number of repeated characters, number of sequences, presence of unexpected character class within the word (e.g. hEllo), presence of date pattern, number of uppercase, number of lowercase, number of digits, number of symbols, presence of keyboard pattern (e.g. qwerty, qazxsw etc.), word strength (using 3rd party strength checker), and presence of leet code (a form of symbolic writing where letters are replaced with numbers or special characters that resemble the shape of the corresponding letters).

Using these features and the prepared dataset, a classical or ensemble ML model (as per configuration) is trained, for example, Logistic Regression, Naive Bayes (Multinomial Naive Bayes), Support Vector Machines (SVM), Decision Trees, Random Forest, Gradient Boosting (e.g., XGBoost, Light-GBM, CatBoost) etc. The textbook split strategy is used for creating training and test dataset (e.g. 80-20 or 70-30). The model is considered as well-performing if the model performance metrics are above the thresholds set in the configuration parameters at step 302 of the method 300. In case of unsatisfactory performance, then the issue is logged for further investigation and a performant model from the same project or role is used. This scenario is possible if sufficient normal word data is not present on the end user machine.

The pre-configured large language model (LLM) is employed in the second pass due to two main reasons: a) associated cost of processing tokens when using 3rd party LLM service, and b) latency due to network communication which increases the overall time of processing. A large language model is very good at identifying sensitive data in free-flowing plaintext when sufficient context is present. For example, for the following prompt 'Extract the sensitive data in the following sentence: The password for accessing the server server.example.net is BabyTiger@Z00.', the LLM (gpt-4-turbo) responds with the following text 'BabyTiger@Z00', whereas gpt-3.5 responds as:

The sensitive data in the given sentence is:

Username/Identifier: There is no explicit username mentioned in the sentence.

Password: BabyTiger@Z00

Server: server.example.net

However, when the same password 'BabyTiger@Z00' is saved in a file 'server.txt' and the prompt given to the LLM (gpt-3.5) is 'There is a file with name 'server.txt' and contains a single word 'BabyTiger@Z00'. Is the file content sensitive?' then the LLM (gpt-3.5) responds as.

The sensitivity of the file content depends on the context and the purpose for which the file is used. In this case, the file 'server.txt' contains the word 'BabyTiger@Z00'. If this word is used as a password or any sensitive information related to a server or system, then the file content can be considered sensitive.

Without further context, it's not possible to determine the specific sensitivity of the file content. If you have concerns about the sensitivity of the information, it's advisable to treat it with caution and follow appropriate security measures.

It can be observed that without sufficient context, the LLM is unable to determine the nature of the content, therefore, with added cost and increased processing, the LLM was unable to give any conclusive result. This is addressed by providing a novel template-based prompt rewriting strategy. The rewriting utilizes the discovered contexts for rewriting the prompt. For example, the prompt: 'There is a file with name 'server.txt' and contains a single word 'BabyTiger@Z00'. Is the file content sensitive?' is rewritten as 'There is a file with name 'server.txt' which contains a single word 'BabyTiger@Z00' with high entropy of 85.21 bits. The file is accessed around the same time when the user visits the domain 'server.example.net' and also the word in the file is updated at regular intervals of 30 days. Is the file content sensitive?', then the output from LLM (gpt-3.5) is:

An exemplary template for scenario when file access has no correlation with domain access is as below:

```
{
    "template": "There is a file with name '{file_name}' which contains a
    single word '{suspected_word}' with high entropy of {word_entropy}
    bits. The average duration between the file access is {access_time}.
    Also the word in the file is updated at regular interval of {modify_time}.
    Is the file content sensitive?",
    "variables": {
    "file_name": "",
    "suspected_word"; "",
    "word_entropy": 0.0,
    "access_time": ""
    }
  }
}
```

An exemplary nested template for scenario when file access overlap with domain access is as below:

```
{
      "template": "There is a file with name '{file_name}' which contains a
      single word '{suspected_word}' with high entropy of {word_entropy}
      bits. {access_time}Also the word in the file is updated at regular
      interval of {modify_time}. Is the file content sensitive?",
      "variables": {
      "file_name": "",
      "suspected_word": "",
      "word_entropy": 0.0,
      "access_time": {
      "template": "The file is accessed around the same time when the user
visits the domain '{domain_name}' ",
      "variables": {
      "domain_name" : ""
      }
    }
  }
}
```

The information provided suggests that the content of the file 'server.txt' may be sensitive. Here's an analysis based on the given details:

High Entropy: The fact that the single word in the file has a high entropy of 85.21 bits implies that it has a high level of unpredictability or randomness. This can be an indicator of a strong and secure password or cryptographic key.

Access Correlation: The file is accessed around the same time as the user visits the domain server.example.net. If the access times are consistently correlated with user activity, it might suggest a connection between the file content and the operations on the server. This could indicate some form of authentication or authorization mechanism.

Regular Updates: The file content is updated at regular intervals of 30 days. This periodic update suggests that the information is actively managed or controlled, which could be for security reasons or compliance requirements.

Considering these factors, it's reasonable to assume that the content of the file 'server.txt' is sensitive, possibly containing a secure credential or key used for server access. The rewriting happens as per the available contextual information, for example, in the above example, the peripheral context (filename, access timestamp, modification timestamp) is used and self-context (entropy of the word). A similar strategy for larger file is adopted and create a template based prompt around the proximity based context of the first pass. Other than the shown templates, many more other templates are utilized and as the data to be filled in is externalized as variables therefore it is easy to write new templates or modify the existing ones.

Thus the password scanner module 206 for the password scanning uses two different kinds of approaches, both of these approaches differ in terms of performance and resource requirements. The need to have two approaches to have a balance between performance and detection accuracy. This helps in faster password detection in the first pass, in case no password is detected then based on the context score, the second pass is performed.

Below is the pseudocode showing the execution pipeline of the password scanner module 206:

```
procedure ExecutePipeline (void)
   config = load_configuration( )
   files = scan_files(config["extensions"], config["scan_method"])
   other_steps = config["composition_policy"]["use_pcp_only"]
   if other_steps is null? then
      other_steps = true
```

-continued

```
  end if
  passwords = { }                          //empty set
  while files is not empty do
    file = next(files)
    if config["composition_policy"] is defined then
      passwords = use_composition_policy(config, file)
    end if
    if other_steps == true then
      steps = config["pipelines"]["1st_pwd"]
      while steps is not empty do
        step = next(steps)
        candidates = execute_step(config, file)
        passwords.append(candidates)
      end while
    end if
  end while
  return passwords
end procedure
```

The correlation module 210 is responsible for initiating the second pass analysis on the text content. In case the enterprise provides a composition policy and the field 'other_steps' in it is set to false then only the composition policy is used for searching the potential passwords. However, if a 'other_steps' are set to true then the steps mentioned in the pipeline are also executed. This is provided in case the enterprise is interested in protecting its own machine only. Hence, the second pass in the password scanning is used for reducing the number of false negatives.

At step 308 of the method 300, the one or more hardware processors 104 of the system 100 are configured to perform in the second pass, a second context scanning on the one or more files and the one or more folders present in each machine, to obtain a second set of content and proximity based contexts. The second context scanning in the second pass is performed only when the first set of potential passwords obtained at step 304 of the method 300 is not empty (not a null set), but the first set of peripheral contexts obtained at step 304 of the method 300 is empty (a null set). The plurality of configuration parameters received at step 302 of the method 300 are utilized while performing the second password scanning.

The main objective of the second context scanning in the second pass is to identify the content and proximity based contexts that are missing in the first pass. Hence, the second set of content and proximity based contexts may contain one or more content based contexts and one or more proximity based contexts if present in the files and the folders.

Similarly, the second context scanning is performed in the second pass, using the plurality of configuration parameters, to obtain the second set of content and proximity based contexts, through the one or more file scanning techniques comprising (i) a LLM enriched path associated context scanning, (ii) a content based context scanning, and (iii) a proximity based context scanning. If more than one file scanning technique is employed in the second pass, then the corresponding sub-sets of contexts are combined to obtain the second set of content and proximity based contexts.

In computer terminology, a 'path' is a sequence of characters which identifies the location of a resource on a given filesystem. Paths can be further divided into system/application generated paths and user created paths. The naming and nesting of folders and files are subjective to a user's behavior and the intended use of the folder. Due to this, the individual components of a 'path' convey something about the purpose of the files stored in the folder and the relationship among them. The LLM enriched path associated context scanning is used to capture the purpose of the files stored in a folder and establishing relationship among various files in the proximity. The analysis done on path in the second pass are:

LLM enriched path associated context scanning-Purpose of the folder can be roughly guessed by using a language model which is trained on a large data corpus and can differentiate between different entities based on common conventions and patterns often used in folder structures. For example, for path 'C:\Alicen\zzPersonal\Expense\Payments', the large language model provides the following labels and associated reason:

Alice folder may contain personal files or information related to an individual named Alice. In zzPersonal, the "Personal" substring suggests that the content within may be personal in nature. The "zz" prefix might be used to sort this folder at the top of the list due to alphabetical sorting. Expense folder seems to be related to expenses and may contain files or sub-folders related to financial transactions or expenditure. Finally, Payments folder under "Expense" suggests that it may specifically contain information related to payments, such as invoices, receipts, or financial transactions record. Putting it all together, it appears that the folders are organized to store personal financial information, specifically focusing on expenses and payments for an individual named Alice. The exact content within these folders would depend on how Alice chooses to organize her files and the specific documents or data she wants to keep track of in relation to her expenses and payments.

The assumption here is that users may store passwords in a folder which are related to them in a personal or professional way. Since this method is primarily an intelligent guessing by a language model, therefore it is used when no other reliable context is found for a potential password with high likelihood score.

The proximity ($\eta$) is the threshold which scopes the distance between two nodes in a tree that are not on the same path. Let T=(V, E) be a general tree, also let x and y be the two nodes on path P1 and P2, such that P1 and P2 only share a common node called their Lowest-Common-Ancestor (LCA). Mathematically, the LCA can be defined as follows: LCA(x, y)=w, where w∈V. If d(u, v) be the distance between any two nodes u and v, then x and y are correlated if and only if, $$\max(d(w, x), d(w, y)) \leq \eta$$

It is based on the assumption that the user tends to save related or similar files in proximity to each other. This can be also termed as Guilt by Association, that is, if a node x is connected to another node y, and node y is associated with certain attributes or characteristics, then there might be a tendency to assume or attribute those attributes to node x as well. This method is helpful when a user has a tendency to save passwords in individual files with very minimal contextual information within the file.

In the content based context scanning, the whole file content is utilized for discovering some structural similarity at file level and word level. The file level structural similarity (used in second pass) gives an idea about what kind of content is stored within it. For example, there are two common ways a user may organize the content for password storage for readability and faster access. One way is by showing the logic for determining whether the content is grouped and the other shows for the unknown format. For known grouping, context likelihood score is boosted by a configured threshold (usually 1.2), which indicates higher chances of finding a password in the file.

Below is the pseudocode for detecting text grouping:

```
1: procedure DetectGroup (file, delimiter)
 2:     group = { }                          //initialize an empty set.
 3:     fp = open(file, 'r')
 4:     for line ∈ fp do
 5:         line = strip(line)               //remove leading and trailing
whitespace.
 6:         parts = split(line, delimiter)       // default delimiter is
whitespace
 7:         if length(parts) == 0 then
 8:             continue
 9:         end if
10:         if length(parts) == 1 then
11:             add(group, 1)                    //1 referes to vertical
layout
12:         else if length(parts) == 3 then
13:             add(group, 2)                   // 2 referes to horizontal
layout
14:         else
15:             add(group, 0)                   // 0 referes to
unknown/no fixed layout
16:         end if
17:     end for
18:     return ((length(group) == 1) ? (list(group)[0]) : 0)
19: end procedure
```

The second content analysis method creates a Trie data-structure from the list of potential passwords in a file. If the branches under a Trie node are above a certain threshold (can be set in the configuration) all the words with common prefix are taken within which the branches are present and pass it to a natural language model for their intended purpose. For example, the following list of strings qualify as a valid password due to minimum length requirement and have sufficiently high entropy: ['CFolder::CFolder', 'CFolder::FindFile', 'CFolder::CreateFile', 'CFolder::CopyFile', 'CFolder::DeleteFile', 'CFolder::CreateFileEx', 'W1$d0m@N1ghT']. Search is done for all prefixes with branches more than a particular threshold. Here a threshold is used for identifying the prefix with branches more than γ. If prefixes whose branches are above the thresholds are present, then all those strings (prefix+branches) are passed to the language model for determining their nature. For example, when the output for a threshold of 3 branches is passed and above to a LLM as the following prompt: 'What kind file extension could have these strings: 'CFolder::CFolder', 'CFolder::CreateFile', 'CFolder::CreateFileEx', 'CFolder::CopyFile'. Answer in not more than 4 words.', then the following output is generated: "C++ Header File", which is sufficient to discard these tokens. Once all the prefixes are present, then all the strings starting with those prefixes are retrieved and created a prompt for the language model as discussed above. The candidate selection logic recursively traverses the Trie tree and extracts the paths that have more branches than threshold.

More formally, let T be the Trie data-structure and γ be the threshold then the function for finding prefixes above threshold f is defined as follows:

$$f(T, \gamma) = \{\text{prefix}|\text{prefix is a path } T\text{, path has more than } \gamma \text{ branches}\}$$

The third method is a density based method which tries to assess the text to space density for detecting text readability.

The intuition for including this analysis is that a user would like to minimize the exposure of their sensitive credentials to shoulder surfing attack by keeping the file sparse for easy and faster information location and to read it clearly in minimum possible attempts. For natural language text, the readability depends on text's presentation and content. The presentation aspect includes the features like character spacing, whitespace, line length etc., whereas the content part includes complexity of vocabulary, syntax, syllables, punctuation density etc. here the readability tests are used as a reasonable context to determine whether a file contains potential passwords or not. The following two readability test for English language (a similar approach can be used for other languages) are implemented:

1. Flesch-Kincaid Readability Tests: This test indicates the level of difficulty of a reading material written in English language. This approach was selected because the NIST Guideline on Passwords prescribes a minimal education level for comprehension of password composition policy. Therefore, the test fits well as it is a metric to estimate the U.S. school grade level required to understand a piece of text. As discussed above, the intuition is that password files would be sparse and easier to read because it helps a user in faster information location and to reading in minimal attempt. For calculating the readability score, the following features are considered:
   a. Word Length ($W_L$)—Longer words can make a text more difficult to read.
   b. Syllables per Word ($S_{W_{avg}}$)—The more syllables per word, the more complex the words, which can contribute to lower readability.
   c. Sentence Length ($S_L$)—Longer sentences are typically harder to understand.
   d. Whitespace Density ($W_{S_d}$)—Whitespace density is used as a factor because wellformatted and spaced text is often more readable.
   e. Punctuation Density ($P_d$)—Punctuation can affect readability, especially when used excessively.

The score is computed using the following equation:

$$R_{Score} = a_1 W_L + a_2 S_{W_{avg}} - a_3 S_L - a_4 W_{S_d} - a_5 P_d$$

Here, $a_1$ to $a_5$ are the weights. The score for all the candidate files is calculated and then rescale their scores by a modified min-max normalization which scales the range in [0, 1]. It is given by, $$\hat{x} = 1 - \frac{x - \min(x)}{\max(x) - \min(x)}$$

If the value of $\hat{x}$ is near to one then the text is dense and it will take time to read, whereas smaller value means that the content is sparse and easily readable. The other density based approach calculates the line length and whitespace count and then calculates text to whitespace density. It is a very simple approach but has a very small CPU and memory footprint.

Prior work has extensively looked at proximity based context for reducing false positives. In the proximity based context scanning, first extract some number of leading and trailing characters around the suspected password and apply one or all of the techniques described below. The amount of text that require analysis can be set in the configuration ("prox_pre_post_chars"). In this work, three main strategies (all of them are part of the second pass) are used:

1. Regular expression based approach for finding supportive text that may indicate that are dealing with potential password. Here, the leading and trailing text is analyzed for domain name, application name, IP address, URL, email and username. If there are one or more hits of different types, then the context likelihood is increased accordingly.
2. Entropy based approach for finding high entropy content in the extracted leading and trailing text like, IP address, server name, URL, email and domain.
3. LLM based approach where leading and trailing text, along with potential password, is provided to a LLM as prompt. For example, In the following text '2B@byT!ger' is the password. Can you identify and underline the supporting text context in the following sentence: The password for accessing the server payments.example.org is "2B@byT!ger". The password should be changed every 30 days. The output of the LLM is: The supporting text context for the password "2B@byT!ger" is identified and underlined below: "The password for accessing the server payments.

At step 310 of the method 300, the one or more hardware processors 104 of the system 100 are configured to combine the first set of potential passwords obtained in the first pass at step 304 of the method 300 and the second set of potential passwords obtained in the second pass at step 306 of the method 300, to obtain a third set of potential passwords. The third set of potential passwords may contain one or more potential passwords if present either in the first set or in the second set of potential passwords.

Similarly, the one or more hardware processors 104 of the system 100 are configured to combine the first set of peripheral contexts obtained in the first pass at step 304 of the method 300 and the second set of content and proximity based contexts obtained in the second pass at step 308 of the method 300, to obtain a third set of contexts. The third set of contexts may contain the one or more peripheral contexts, the one or more content based contexts, and the one or more proximity based contexts if present either in the first set and in the second set respectively.

If both the first set of potential passwords and the first set of peripheral contexts are not empty (not null sets), then the steps 306 and 308 of the method 300 are not executed and thus the third set of potential passwords contains only the first set of potential passwords obtained in the first pass at step 304 of the method 300, and the third set of contexts contains only the first set of peripheral contexts obtained in the first pass at step 304 of the method 300.

If any of the third set of potential passwords and the third set of contexts are not empty (not null sets) or both the third set of potential passwords and the third set of contexts are not empty (not null sets), then the corresponding machine must have the potential passwords or the contexts, or both and such machine is marked as not safe and the necessary action may be taken by the security administrator.

At step 312 of the method 300, the one or more hardware processors 104 of the system 100 are configured to determine a confidence score for each potential password of the third set of potential passwords obtained at step 310 of the method 300. The confidence score for each potential password is determined using a likelihood of the associated potential password with one or more contexts in the third set of contexts obtained at step 310 of the method 300.

The correlation module 210 is responsible for gathering the outputs from the password scanner module 206 and the context scanner module 208 and then calculating a confidence score using their respective likelihood scores. As a first step, it performs a check whether there is a need to perform a second pass for identifying potential passwords or perform a second pass for discovering relevant context for a suspected password. In case both the context and the password sets are empty then further analysis is aborted, otherwise proceeded with calculating the confidence score. Finally, a tuple of the following values is obtained: file, suspected password, password likelihood, contexts with their individual likelihood scores and confidence score.

Below is the pseudocode showing the correlation algorithm for execution by the correlation module 210:

```
1: procedure CorrelatePwdCtx(file, config, pwds, cntxs)
2:        if (pwds == Ø) and (cntxs == Ø) then
3:          return
4:        else if (pwds != Ø) and (cntxs == Ø) then
5:          cntxs = ContextSecondPass(file, config, pwds) //peripheral and
content cntx
6:        else if (pwds == Ø) and (cntxs != Ø) then
7:          pwds = PasswordSecondPass(file, config, cntxs) //local model
and LLM
8:         end if
9:        prox_cntx = { }
10:       confidence = 0.0
11:       pwd_set = { }
12:       for pwd ∈ pwds do
13:         confidence = pwd.likelihood
14:         relevant_cntx = { }
15:         prox_cntx = GetProximityContext(file, pwd, config)
16:         if prox_cntx != Ø then
17:           if prox_cntx. likelihood > config["thresholds"]["proximity"]
then
18:             confidence += config["thresholds"]["proximity"]
19:             add(relevant_cntx, prox_cntx)
20:             confidence += config["thresholds"]["peripheral"]
21:             add(relevant_cntx, cntxs["peripheral"])
22:           else
23:            if cntxs["peripheral"].likelihood >
config["thresholds"]["peripheral"]then
24              confidence += config["thresholds"]["peripheral"]
25              add(relevant_cntx, cntxs["peripheral"])
```

-continued

```
26:                  end if
27:               end if
28:            else
29:             if cntxs["peripheral"].likelihood > config["thresholds"]["peripheral"] then
30                confidence += config["thresholds"]["peripheral"]
31:               add(relevant_cntx, cntxs["peripheral"])
32:            end if
33: end if
34:
35:            if cntxs["content"].likelihood > config["thresholds"]["content"] then
36:               confidence += con fig["thresholds"]["content"]
37:               add(relevant_cntx, cntxs["content"])
38:            end if
39:
40:            if confidence > config["thresholds"]["confidence"] then
41:               pwd_set[pwd] = (relevant_cntx, confidence)
42:            end if
43:            end for
44:            return (file, pwd_set)
45: end procedure
```

At step 314 of the method 300, the one or more hardware processors 104 of the system 100 are configured to assign a rank to each potential password in the third set of potential passwords obtained at step 310 of the method 300. The rank for each potential password is assigned based on the association with the associated confidence scores determined at step 312 of the method 300. Further, a predefined ranking technique among a list of predefined ranking techniques is employed to assign the rank to each potential password.

The ranking module 212 is responsible for arranging the outcome of the correlation module 210 for reporting by the reporting module 216 and for limiting the access to the identified files. A list of predefined ranking techniques (algorithms) are:

- Simple ranking consists of arranging the output of correlation module in decreasing order of confidence scores.
- Reuse ranking is based on the well-known fact that users tend to reuse passwords and patterns. It is used to cluster the passwords (therefore files) with common passwords and patterns, and boost confidence scores by a configurable factor of '>1' so as to prioritize them over the unique candidates as their risk of exposure is much greater than the other. The reuse is detected by performing Jaccard similarity on the potential password string. If the similarity is more than a threshold (a value of 0.5 is fine for small strings), then is used for boosting the confidence. Apart from Jaccard similarity, any other locality sensitive hashing techniques such as SimHash and MinHash, can be used for checking pattern reuse.
- Strength based ranking is based on the fact that most of the password cracking tools and algorithms utilize the breached password dataset for modelling the user behavior. Also, most of the users tend to create weak passwords for easy memorability. The strength of each candidate password is calculated and if the password strength is lower than a threshold value then the confidence scores are boosted by a configurable factor of '>1'.
- Spread based ranking, if certain potential passwords and contexts are found to be appearing on more than one device then the confidence scores are boosted by a configurable factor of '>1'. This scenario represents plaintext storage of shared account credentials, usually shared access credentials of database, server or mainframe etc. As the spread is more therefore, they have higher chances of being leaked due to their spread on different network devices. This processing happens at server side, therefore, to safeguard the privacy of user.

At step 316 of the method 300, the one or more hardware processors 104 of the system 100 are configured to validate an authenticity of a user to access the files containing the third set of potential passwords obtained at step 310 of the method 300. The authenticity is validated based on presence of one or more potential passwords in the associated file, with a confidence score greater than a predefined threshold. In an embodiment, the predefined threshold is.

Figure 4:
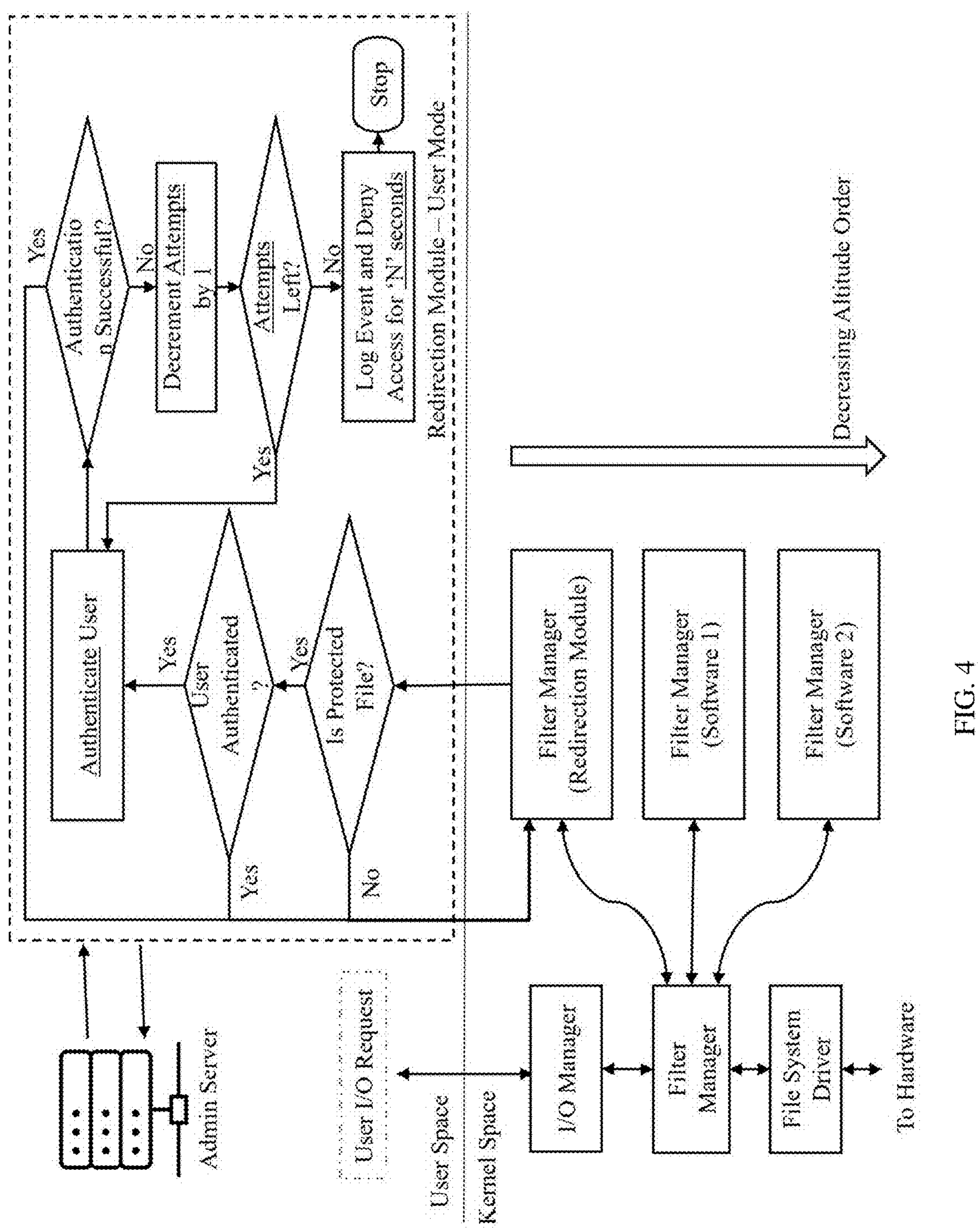
FIG. 4 shows a block diagram and information flow in the redirection module, in accordance with some embodiments of the present disclosure.

The redirection module 214 is responsible for validating authenticity of the user to access the files containing the third set of potential passwords. The redirection module consists of two main components: 1) a kernel mode filter driver, and 2) a user mode application. The kernel mode filter driver is responsible for rerouting the I/O calls to the user-mode application. In user mode, the application checks whether the requested file is identified as sensitive due to potential password or not. If the file is not considered sensitive, then the whole application works as transparent passthrough and the call is sent back to the filter driver for further processing. However, if the file is considered sensitive then it is checked whether the user is authenticated or not. If not, then the user is asked to authenticate again using the configured protocol (e.g. NTLM, Kerberos etc.). In case the user fails to authenticate themselves in configured 'X' attempts then a cooldown period of 'N' seconds is started before which the user can request access to a sensitive file again. This approach does not interfere with all the I/O system calls, rather the access is checked only at the time of opening the file and only for files that are identified as containing passwords. FIG. 4 shows a block diagram and information flow in the redirection module 214, in accordance with some embodiments of the present disclosure.

At step 318 of the method 300, the one or more hardware processors 104 of the system 100 are configured to create a risk profile, based on the third set of potential passwords along with the associated ranks for reporting to the security administrator. The risk profile is created under a user level for each user associated with each machine, a machine level for each machine present in the enterprise, and an enterprise level which is for the entire enterprise. It is implicit that the risk profile under the enterprise level is created based on the risk profile of each of the one or more machines present in the enterprise.

The reporting module 216 is responsible for creating the risk profile and reporting to the security administrator. The main task of this module is to maintain an audit trail by capturing the security events from ranking module and redirection module. The security events are further used for the following purposes:

Risk Profiling—The logged security events are used for creating risk profiles of individual users, enterprise assets, and the enterprise itself. The risk profile of the user is created based on the following parameters:

Number of unique account credentials that are found—This indicates the level of exposure as more the accounts than a larger risk of exposure.

Completeness of the information—Whether whole access information is revealed by storing the whole information about an account (e.g. application/domain/server/IP address, username and password) or just partial information.

Reuse of pattern/passwords—This indicates a user's habit of reusing known pattern and passwords, which indicates higher susceptibility to probabilistic guessing attacks on an account for which the data is not found on the system.

Recency of change of password—Stale password means that the account credentials are not updated for a long time. On the other hand, too many changes in short duration means that the user might have adopted a coping strategy (e.g. pattern reuse or dictionary based passwords) for memorability and compliance.

Installed security software—Indicates the type of protection a user might have against data breach. This is important if the user access diverse assets and the kind of data that they have.

User awareness—Whether the user is aware of potential threats of storing passwords in plaintext. If they are aware and yet they still do then it means casual behavior that requires immediate intervention by management. If they are not aware, then conduct relevant training to educate them.

User behavior—A user's own behavior while accessing the internet (type of sites and associated threat levels to these sites), creating the password and storing it on the disk (whether in a single file or distributed in multiple files).

For asset risk profile, the following parameters are considered:

Number of unique accounts on the device—This indicates the level of exposure as more the accounts than a larger risk of exposure.

Recency of change of password—Stale password means that the account credentials are updated for a long time. On the other hand, too many changes in short duration means that the user may adopt a coping strategy (e.g. pattern reuse or dictionary based passwords) for memorability and compliance.

Installed security software—Indicates the type of protection a user might have against data breach. This is important if the user access diverse assets and the kind of data that they have.

Shared account credential—This is indicative of higher risk exposure as it is hard to ascertain the exact number of users who have access. Also, updating password becomes an issue as it would hamper the working of employees. Also, it increases the threat surface for cyber attack.

For enterprise risk profile, following parameters are considered:

Number of employees at risk—Indicates issue with compliance with enterprise policy on password creation and management.

Number of assets at risk—Assets that have multiple accounts, weird password update policy and have shared credentials issues.

Reuse habit—If a large number of employees are used to password and pattern reuse then it increases the risk for an enterprise of probabilistic guessing attacks.

Shared credentials—Number of devices that are shared between the employees.

Reachability—If the credentials of an employee are leaked then how many assets will be impacted.

Some of the data for profiling is directly available from the events that are sent to the reporting module 216 while some data may require additional probing of the system (e.g. installed security software, awareness level and user behavior analysis). A vector of dimension with size is generated with values ranging from 0 to 10, where 10 means highest threat and 0 means no threat.

Training and resource allocation—If the risk profile score of an individual is higher than expected threshold then retrain them. Similarly, if the risk profile score of an asset is more than a certain threshold then additional security controls can be allocated for that asset. This selective allocation helps in reducing licensing cost.

The methods and systems of the present disclosure mainly focus is on identifying the right contexts that helps in reducing the number of false positives and number of false negatives and provide a way to secure access to files identified as containing potential passwords. Also, unlike prior work that aim to improve the detection method, the methods and systems of the present disclosure use simple and less computing intensive techniques for detecting potential passwords. In parallel, a stepped context analysis is performed which applies different context discovery strategies in sequential manner where execution of a step happens if the likelihood score of the previous step is more than a configured threshold. The step wise execution of context discovery helps in reducing the computational overheads as not all steps are executed in a single go (performance). It also helps in faster lookup (performance) and validation of a potential password against a context (false positive reduction). In scenarios, where a potential password is unable to find in a file using simple detection method, but if the context likelihood of the file is higher than the configured threshold then the file is searched again with more detailed techniques for detecting presence of a potential password. This selective second pass for a few files helps in reducing the false negatives while balancing the proposed solution's performance.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein address unresolved problems of building rich context for effective password detection in plaintext. The present disclosure provides a way to identify potential passwords in free-flowing plaintext files that are stored on a storage media. By free flowing refers that the text does not have any associated syntax and semantics, thus making password discovery very hard. The linguistic and extra-linguistic features are used to discover a context within which a word is used and, therefore, classifying the word as a potential password or not. For this, a peripheral context, content-based context, and proximity context are used for analyzing whether a suspected word is actually a password or not. Further, the prediction performance of a natural language model (LM and LLM) is improved by generating a reformatted text input/prompt with embedded identified contexts. This approach helps in reducing the CPU and Memory usage significantly and helps in mitigating the number of false positives and false negatives. Finally, the kernel-based module is used for safeguarding files with potential passwords for minimizing the risk of leakage of sensitive content till the time the content is migrated to a safe repository and the file is purged or the protection is explicitly disabled by the user.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

receiving, via one or more hardware processors, a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models;

simultaneously performing in a first pass, via the one or more hardware processors, a first password scanning and a first context scanning, on the one or more files and the one or more folders present in each machine of the enterprise, using the plurality of configuration parameters, to obtain a first set of potential passwords and a first set of peripheral contexts respectively;

performing in a second pass when the first set of potential passwords is empty and the first set of peripheral contexts is not empty, via the one or more hardware processors, a second password scanning on the one or more files and the one or more folders present in each machine, using the plurality of configuration parameters, to obtain a second set of potential passwords;

performing in the second pass when the first set of potential passwords is not empty and the first set of peripheral contexts is empty, via the one or more hardware processors, a second context scanning on the one or more files and the one or more folders present in each machine, using the plurality of configuration parameters, to obtain a second set of content and proximity based contexts; and combining, via the one or more hardware processors, (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively.

2. The processor-implemented method of claim 1, further comprising:

determining, via the one or more hardware processors, a confidence score for each potential password of the third set of potential passwords, using a likelihood of the associated potential password with one or more contexts in the third set of contexts;

assigning, via the one or more hardware processors, a rank to each potential password in the third set of potential passwords, in association with the associated confidence scores, using a predefined ranking technique;

validating, via the one or more hardware processors, an authenticity of a user to access the files containing the third set of potential passwords, based on presence of one or more potential passwords in the associated file, with the confidence score greater than a predefined threshold; and creating, via the one or more hardware processors, a risk profile under (i) a user level associated with each machine, (ii) a machine level, and (iii) an enterprise level, based on the third set of potential passwords along with the associated ranks for reporting.

3. The processor-implemented method of claim 1, wherein the first password scanning is performed in the first pass, using the plurality of configuration parameters, to obtain the first set of potential passwords, through one or more of (i) a composition policy-based scanning, (ii) a frequency table based scanning, (iii) an entropy based scanning, and (iv) a deep learning based scanning.

4. The processor-implemented method of claim 3, wherein:

the first password scanning is performed through the composition policy-based scanning using the plurality of configuration parameters, in the first pass, to obtain a first sub-set of files and an associated first sub-set of potential passwords, the first password scanning is performed through the frequency table based scanning using the plurality of configuration parameters and by employing a trained frequency table, in the first pass, to obtain a second sub-set of files and an associated second sub-set of potential passwords, the first password scanning is performed through the entropy based scanning using the plurality of configuration parameters, in the first pass, by employing (i) word level analysis, (ii) line level analysis, (iii) a sentence level analysis, and (iv) a file level analysis, to obtain a third sub-set of files and an associated third sub-set of potential passwords, and the first password scanning is performed through the deep learning based scanning using the plurality of configuration parameters, in the first pass, by employing a trained deep learning model, to obtain a fourth sub-set of files and an associated fourth sub-set of potential passwords.

5. The processor-implemented method of claim 1, wherein the first context scanning is performed, using the plurality of configuration parameters, to obtain the first set of peripheral contexts through one or more of (i) a browser data-related scanning, (ii) an application name-related scanning, (iii) a file access and a data modification related scanning, and (iv) a file attribute scanning.

6. The processor-implemented method of claim 5, wherein:

the first context scanning is performed through the browser data-related scanning using the plurality of configuration parameters, in the first pass, to obtain a first sub-set of peripheral contexts, the first context scanning is performed through the application name-related scanning using the plurality of configuration parameters in the first pass, to obtain a second sub-set of peripheral contexts, the first context scanning is performed through the file access and the data modification related scanning, using the plurality of configuration parameters, in the first pass, to obtain a third sub-set of peripheral contexts, and the first context scanning is performed through the file attribute scanning using the plurality of configuration parameters, in the first pass, to obtain a fourth sub-set of peripheral contexts.

7. The processor-implemented method of claim 1, wherein the second password scanning is performed in the second pass, using the plurality of configuration parameters, to obtain the second set of potential passwords through one or more of (i) a trained machine learning (ML)-based classification model, and (ii) a pre-configured large language model (LLM).

8. The processor-implemented method of claim 7, wherein the trained ML-based classification model is obtained by:

receiving a publicly available password dataset from a repository;

extracting a plurality of valid sentences present in one or more files of the one or more folders present in each machine;

creating a list of tokens by tokenizing each of the plurality of valid sentences or splitting each of the plurality of valid sentences with a predefined delimiter;

pre-processing the list of tokens, using one or more pre-processing techniques, to obtain a pre-processed list of tokens;

extracting a set of predefined features from each of (i) the publicly available password dataset and (ii) the pre-processed list of tokens, to obtain a labelled training data; and training a predefined ML-based classification model with the labelled training data using the plurality of configuration parameters, to obtain the trained ML-based classification model.

9. The processor-implemented method of claim 1, wherein the second context scanning is performed in the second pass, using the plurality of configuration parameters, to obtain the second set of content and proximity based contexts through one or more of (i) a LLM enriched path associated context scanning, (ii) a content based context scanning, and (iii) a proximity based context scanning.

10. A system, comprising:

a memory storing instructions;

one or more input/output (I/O) interfaces;

one or more hardware processors coupled to the memory via the one or more I/O interfaces, wherein the one or more hardware processors are configured by the instructions to:

receive a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models;

simultaneously perform in a first pass, a first password scanning and a first context scanning, on the one or more files and the one or more folders present in each machine of the enterprise, using the plurality of configuration parameters, to obtain a first set of potential passwords and a first set of peripheral contexts respectively;

perform in a second pass when the first set of potential passwords is empty and the first set of peripheral contexts is not empty, a second password scanning on the one or more files and the one or more folders present in each machine, using the plurality of configuration parameters, to obtain a second set of potential passwords;

perform in the second pass when the first set of potential passwords is not empty and the first set of peripheral contexts is empty, a second context scanning on the one or more files and the one or more folders present in each machine, using the plurality of configuration parameters, to obtain a second set of content and proximity based contexts; and combine (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively.

11. The system of claim 10, wherein the one or more hardware processors are further configured by the instructions to:

determine a confidence score for each potential password of the third set of potential passwords, using a likelihood of the associated potential password with one or more contexts in the third set of contexts;

assign a rank to each potential password in the third set of potential passwords, in association with the associated confidence scores, using a predefined ranking technique;

validate an authenticity of a user to access the files containing the third set of potential passwords, based on presence of one or more potential passwords in the associated file, with the confidence score greater than a predefined threshold; and create a risk profile under (i) a user level associated with each machine, (ii) a machine level, and (iii) an enterprise level, based on the third set of potential passwords along with the associated ranks for reporting.

12. The system of claim 10, wherein the one or more hardware processors are configured to perform the first password scanning in the first pass, using the plurality of configuration parameters, to obtain the first set of potential passwords, through one or more of (i) a composition policy-based scanning, (ii) a frequency table based scanning, (iii) an entropy based scanning, and (iv) a deep learning based scanning.

13. The system of claim 12, wherein the one or more hardware processors are configured to perform:

the first password scanning through the composition policy-based scanning using the plurality of configuration parameters, in the first pass, to obtain a first sub-set of files and an associated first sub-set of potential passwords, the first password scanning through the frequency table based scanning using the plurality of configuration parameters and by employing a trained frequency table, in the first pass, to obtain a second sub-set of files and an associated second sub-set of potential passwords, the first password scanning through the entropy based scanning using the plurality of configuration parameters, in the first pass, by employing (i) word level analysis, (ii) line level analysis, (iii) a sentence level analysis, and (iv) a file level analysis, to obtain a third sub-set of files and an associated third sub-set of potential passwords, and the first password scanning through the deep learning based scanning using the plurality of configuration parameters, in the first pass, by employing a trained deep learning model, to obtain a fourth sub-set of files and an associated fourth sub-set of potential passwords.

14. The system of claim 10, wherein the one or more hardware processors are configured to perform the first context scanning, using the plurality of configuration parameters, to obtain the first set of peripheral contexts through one or more of (i) a browser data-related scanning, (ii) an application name-related scanning, (iii) a file access and a data modification related scanning, and (iv) a file attribute scanning.

15. The system of claim 14, wherein the one or more hardware processors are configured to perform:

the first context scanning through the browser data-related scanning using the plurality of configuration parameters, in the first pass, to obtain a first sub-set of peripheral contexts, the first context scanning through the application name-related scanning using the plurality of configuration parameters in the first pass, to obtain a second sub-set of peripheral contexts, the first context scanning through the file access and the data modification related scanning, using the plurality of configuration parameters, in the first pass, to obtain a third sub-set of peripheral contexts, and the first context scanning through the file attribute scanning using the plurality of configuration parameters, in the first pass, to obtain a fourth sub-set of peripheral contexts.

16. The system of claim 10, wherein the one or more hardware processors are configured to perform the second password scanning in the second pass, using the plurality of configuration parameters, to obtain the second set of potential passwords through one or more of (i) a trained machine learning (ML)-based classification model, and (ii) a pre-configured large language model (LLM).

17. The system of claim 16, wherein the one or more hardware processors are configured to obtain the trained ML-based classification model, by:

receiving a publicly available password dataset from a repository;

extracting a plurality of valid sentences present in one or more files of the one or more folders present in each machine;

creating a list of tokens by tokenizing each of the plurality of valid sentences or splitting each of the plurality of valid sentences with a predefined delimiter;

pre-processing the list of tokens, using one or more pre-processing techniques, to obtain a pre-processed list of tokens;

extracting a set of predefined features from each of (i) the publicly available password dataset and (ii) the pre-processed list of tokens, to obtain a labelled training data; and training a predefined ML-based classification model with the labelled training data using the plurality of configuration parameters, to obtain the trained ML-based classification model.

18. The system of claim 10, wherein the one or more hardware processors are configured to perform the second context scanning in the second pass, using the plurality of configuration parameters, to obtain the second set of content and proximity based contexts through one or more of (i) a LLM enriched path associated context scanning, (ii) a content based context scanning, and (iii) a proximity based context scanning.

19. One or more non-transitory machine-readable information storage mediums comprising one or more instructions which when executed by one or more hardware processors cause:

receiving a plurality of configuration parameters to build a rich context for password detection in a plaintext of one or more files and one or more folders present in each machine of an enterprise, wherein the plurality of configuration parameters comprises (i) a first set of parameters associated with each of one or more password composition policies, (ii) a second set of parameters associated with each of one or more file scanning techniques, (iii) a third set of parameters associated with one or more thresholds, (iv) a fourth set of parameters associated with each of one or more analysis pipelines, (v) a fifth set of parameters associated with file access redirection, and (vi) a sixth set of parameters associated with one or more model parameters of each of one or more models;

simultaneously performing in a first pass, a first password scanning and a first context scanning, on the one or more files and the one or more folders present in each machine of the enterprise, using the plurality of configuration parameters, to obtain a first set of potential passwords and a first set of peripheral contexts respectively;

performing in a second pass when the first set of potential passwords is empty and the first set of peripheral contexts is not empty, a second password scanning on the one or more files and the one or more folders present in each machine, using the plurality of configuration parameters, to obtain a second set of potential passwords;

performing in the second pass when the first set of potential passwords is not empty and the first set of peripheral contexts is empty, a second context scanning on the one or more files and the one or more folders present in each machine, using the plurality of configuration parameters, to obtain a second set of content and proximity based contexts; and combining (i) the first set of potential passwords obtained in the first pass and the second set of potential passwords obtained in the second pass, and (ii) the first set of peripheral contexts obtained in the first pass and the second set of content and proximity based contexts obtained in the second pass, to obtain a third set of potential passwords and a third set of contexts, respectively.

20. The one or more non-transitory machine-readable information storage mediums of claim 19, wherein the one or more instructions which when executed by one or more hardware processors further cause:

determining a confidence score for each potential password of the third set of potential passwords, using a likelihood of the associated potential password with one or more contexts in the third set of contexts;

assigning a rank to each potential password in the third set of potential passwords, in association with the associated confidence scores, using a predefined ranking technique;

validating an authenticity of a user to access the files containing the third set of potential passwords, based on presence of one or more potential passwords in the associated file, with the confidence score greater than a predefined threshold; and creating a risk profile under (i) a user level associated with each machine, (ii) a machine level, and (iii) an enterprise level, based on the third set of potential passwords along with the associated ranks for reporting.

* * * * *